US00RE39134E

(19) United States
(12) Reissued Patent
Ohnishi et al.

(10) Patent Number: US RE39,134 E
(45) Date of Reissued Patent: Jun. 13, 2006

(54) AUTOMATIC TRANSMISSION CONTROL SYSTEM FOR AN AUTOMOBILE

(75) Inventors: Hiroshi Ohnishi, Takamatsu (JP); Kouji Kitano, Takamatsu (JP); Mitsuo Kayano, Fukuoka (JP); Nobuo Kurihara, Hachinohe (JP)

(73) Assignee: Hitachi, Ltd., Tokyo (JP)

(21) Appl. No.: 10/164,368

(22) Filed: Jun. 10, 2002

Related U.S. Patent Documents

Reissue of:
(64) Patent No.: 5,510,982
Issued: Apr. 23, 1996
Appl. No.: 07/985,199
Filed: Dec. 3, 1992

U.S. Applications:
(63) Continuation of application No. 09/064,765, filed on Apr. 23, 1998, now abandoned.

(30) Foreign Application Priority Data

Dec. 3, 1991 (JP) ..... 3-319205

(51) Int. Cl.
*B60K 17/06* (2006.01)

(52) U.S. Cl. ..... 701/55; 477/120; 477/900; 706/905

(58) Field of Classification Search ..... 701/51, 701/55, 56, 53; 477/115, 120, 900; 706/905
See application file for complete search history.

(56) References Cited

U.S. PATENT DOCUMENTS 4,836,057 A * 6/1989 Asayama et al. ..... 477/120
5,035,160 A * 7/1991 Morita ..... 477/154
5,088,354 A * 2/1992 Asada ..... 475/276
5,140,870 A * 8/1992 Asada ..... 364/424.1
5,231,582 A * 7/1993 Takahashi et al. ..... 364/424.1
5,231,897 A * 8/1993 Morita ..... 364/424.1 X
5,267,158 A * 11/1993 Sakaguchi et al. ..... 364/424.1
5,292,288 A * 3/1994 Kashiwabara et al. ..... 477/156
5,309,790 A * 5/1994 Tanaka ..... 477/161
5,319,555 A * 6/1994 Iwaki et al. ..... 364/424.1

FOREIGN PATENT DOCUMENTS

DE 2852195 C2 * 6/1980
DE 28 52 195 C2 6/1980
DE 33 34 716 4/1985
DE 33 41 652 C2 6/1985
DE 3341652 C2 * 6/1985
DE 35 39 682 C2 5/1986
DE 3539682 C2 * 5/1986
DE 4010104 A1 * 10/1990
DE 40 10 104 A1 10/1990
DE 41 12 577 10/1991

(Continued)

*Primary Examiner*—Michael J. Zanelli
(74) *Attorney, Agent, or Firm*—Crowell & Moring LLP

(57) ABSTRACT

An automatic transmission control system for an automobile, comprising a vehicle weight estimation unit which estimates a vehicle weight of the automobile a torque estimation unit which estimates an output torque, an acceleration input unit which accepts an acceleration signal; a load estimation unit (110) which estimates a running load from the estimated vehicle weight, the estimated output torque and the accepted acceleration; a memory which stores a plurality of shift schedules therein; and a gear position determination unit (109) which includes the memory, and which selects one of the shift schedules in accordance with the vehicle weight and the estimated running load, so as to determine a gear position of an automatic transmission of the automobile in conformity with the selected shift schedule. An exact shift operation conformed to the vehicle weight and the running load can be performed, and an enhanced fuel consumption can be attained.

12 Claims, 20 Drawing Sheets

FOREIGN PATENT DOCUMENTS

| | | | | |
|---|---|---|---|---|
| EP | 0375155 | A1 | * | 6/1990 |
| EP | 03 75 155 | A1 | | 6/1990 |
| JP | 56153146 | A | | 11/1981 |
| JP | 62113956 | A | | 5/1987 |
| JP | 63-45976 | | * | 9/1988 |
| JP | 01058861 | A | | 3/1989 |
| JP | 02-138560 | | | 5/1990 |
| JP | 03-092667 | | | 4/1991 |
| JP | 3-117 769 | A | | 5/1991 |
| JP | 3-117769 | | * | 5/1991 |
| JP | 3-134363 | | * | 6/1991 |
| JP | 3-134 363 | A | | 6/1991 |
| WO | 91/15 689 | A1 | | 10/1991 |
| WO | 91/15689 | A1 | * | 10/1991 |

* cited by examiner

ENGINE TORQUE MAP

TORQUE CONVERTER CHARACTERISTIC MAP

AUTOMATIC TRANSMISSION CONTROL SYSTEM FOR AN AUTOMOBILE

Matter enclosed in heavy brackets [ ] appears in the original patent but forms no part of this reissue specification; matter printed in italics indicates the additions made by reissue.

*This application is a continuation of reissue application Ser. No. 09/064,765, filed 23 Apr. 1998 now abandoned and is related to co-pending U.S. Reissue patent application Ser. No. 09/498,856 filed Feb. 4, 2001.*

BACKGROUND OF THE INVENTION

The present invention relates to transmission control systems for automobiles.

A prior-art transmission control system for an automobile is so constructed that a vehicle speed and a throttle valve opening are sensed as electric signals, and that a predetermined shift gear corresponding to the current values of the vehicle speed and the throttle valve opening is selected on the basis of a shift pattern which is preset, with the vehicle speed and the throttle valve opening as variables. Herein, a plurality of such shift patterns are set beforehand, and one of them is selected by the manipulation of the driver of the automobile.

In another transmission control system, the shift patterns are automatically selected and changed-over in accordance with the driving operation of the driver.

The control of a transmission in the prior art is such that a predetermined gear position corresponding to the current values of a vehicle speed and a throttle valve opening is selected on the basis of a shift pattern which is preset, with the vehicle speed and the throttle vale opening as variables.

In addition, the official gazette of Japanese Patent Application Publication No. 45976/1988 discloses a technique wherein a torque is evaluated from the pressure of an intake pipe, and a transmission gear ratio [(r.p.m. of an internal combustion engine)/(vehicle speed)] is determined from the torque.

These methods have made performing an exact shift operation for the fluctuations of drive conditions difficult, especially for the change of a running load. For example, it is considered that the fuel consumption of the automobile will be enhanced without spoiling the drivability thereof, by upshifting earlier on a flat road or a gentle downward slope rather than on an upward slope. Such a shift operation, however, has heretofore been impossible because of the gear shift based on only the throttle valve opening and the vehicle speed.

Besides, as the vehicle is lightened, it becomes important to perform the shift control so as to correspond to the change of acceleration characteristics dependent upon the weight of the vehicle in the case of a starting acceleration. It is therefore considered possible to enhance the fuel consumption and to perform the exact shift operation corresponding to the drive conditions, in such a way that the running load and the vehicle weight are estimated, and that the shift pattern is changed in accordance with the vehicle weight and the running load in an accelerating mode, while it also is changed in accordance with the running load in a decelerating mode.

Since the shift pattern is determined on the basis of the several typical drive conditions as stated above, the prior-art techniques have been sometimes incapable of the shift operation which reflects the drive conditions exactly. As a result, they have often worsened the fuel consumption.

SUMMARY OF THE INVENTION

An object of the present invention is to provide an automatic transmission control system for an automobile in which the running load of the automobile is estimated so as to perform a shift operation which conforms to the running load.

In order to accomplish the object, an automatic transmission control system for an automobile in one aspect of performance of the present invention is constructed comprising load computation means for computing the automobile load; output torque estimation means for calculating an output torque with reference to the torque characteristics of the drive train of the automobile; running load estimation means for estimating a running load from the automobile load and the output torque; memory means for storing at least two shift schedules therein; and a shift schedule variable-control unit which determines a shift schedule of an automatic transmission of the automobile during actual running of the automobile, on the basis of the estimated running load and the stored shift schedules.

Besides, in order to perform a shift operation which is based on, not only a running load, but also an estimated vehicle weight of an automobile, an automatic transmission control system for an automobile in another aspect of performance of the present invention may well be constructed comprising vehicle weight estimation means for estimating weight of the automobile; torque estimation means for estimating an output torque; acceleration input means for accepting an acceleration signal; running load estimation means for estimating the running load from the estimated vehicle weight, the estimated output torque and the input acceleration; memory means for storing a plurality of shift schedules therein; and gear position determination means for selecting one of the shift schedules on the basis of the vehicle weight and the estimated running load, and for determining a gear position of an automatic transmission of the automobile in accordance with the selected shift schedule.

In operation, the running load (and the vehicle weight) are estimated, and the shift operation is performed in conformity with the vehicle weight and the running load. Therefore, the optimal shift pattern is formed in accordance with a driving environment such as a mountain path, to enhance the drivability of the automobile. Moreover, on a flat road, the fuel consumption of the automobile is enhanced.

Other objects, advantages and novel features of the present invention will become apparent from the following detailed description of the invention when considered in conjunction with the accompanying drawings.

PREFERRED EMBODIMENTS OF THE INVENTION

Now, embodiments of the present invention will be described with reference to the drawings. In the ensuing description, an expression "change gear ratio" or "gear ratio" shall mean the product between the gear ratio of a transmission and that of a final drive.

Figure 1:
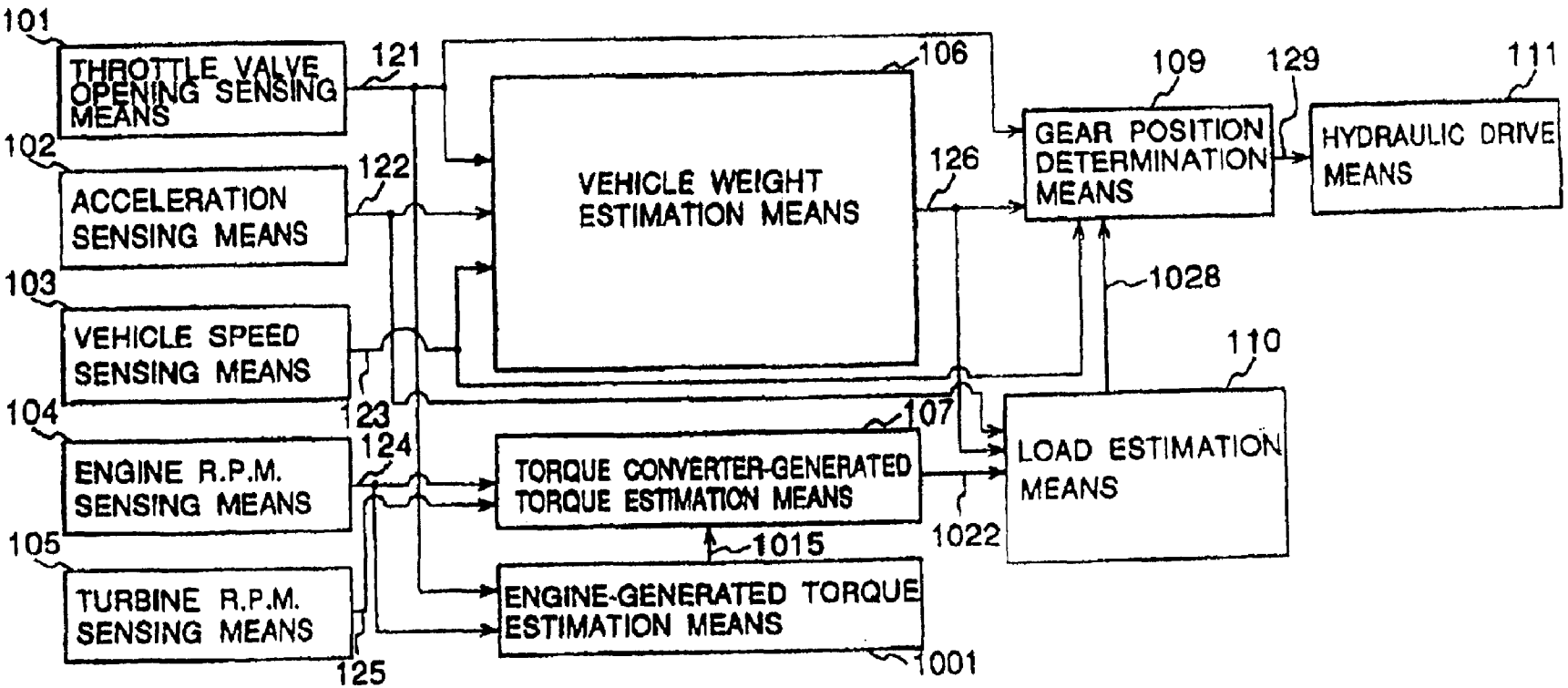
FIG. 1 is a block diagram of a shift control system which includes an automatic transmission control system in an embodiment of the present invention.

The schematic construction of an automatic transmission control system for an automobile in one embodiment of the present invention is illustrated in FIG. 1.

Throttle valve opening (TVO) sensing means 101 senses a throttle valve opening 121 in the automobile, which is delivered to vehicle weight estimation means 106, engine-generated torque estimation means 1001 and gear position determination means 109.

Acceleration sensing means 102 senses the acceleration 122 of the automobile, which is delivered to the vehicle weight estimation means 106 and load estimation means 110.

Vehicle speed sensing means 103 senses the vehicle speed 123 of the automobile, which is delivered to the vehicle weight estimation means 106 and the gear position determination means 109.

Engine r.p.m. sensing means 104 senses engine r.p. m. ("revolutions per minute" also termed an "engine speed") 124 in the automobile, which is delivered to torque converter-generated torque estimation means 107 and the engine-generated torque estimation means 1001. The torque converter-generated torque estimation means 107 and the engine-generated torque estimation means 1001 are means for estimating torques generated by the torque converter of the automobile and the engine thereof, respectively.

Turbine r.p.m. sensing means 105 senses turbine r.p. m. (also termed a "turbine speed") 125 in the automobile, which is delivered to the torque converter-generated torque estimation means 107.

In the vehicle weight estimation means 106, the vehicle weight of the automobile is estimated on the basis of the throttle valve opening 121, acceleration 122 and vehicle speed 123. The estimated vehicle weight 126 is delivered to the gear position determination means 109 and the load estimation means 110.

In the torque converter-generated torque estimation means 107, the torque generated by the torque converter is estimated from the engine speed 124 and the turbine speed 125. The estimated torque 1022 generated by the torque converter is delivered to the load estimation means 110.

In the engine-generated torque estimation means 1001, the torque generated by the engine is estimated from the throttle valve opening 121 and the engine speed 124. The estimated torque 1015 generated by the engine is delivered to the torque converter-generated torque estimation means 107.

In the load estimation means 110, a load torque is estimated from the estimated vehicle weight 126, the estimated torque 1022 generated by the torque converter, and the acceleration 122. The estimated load torque 1028 is delivered to the gear position determination means 109.

In the gear position determination means (which is also means for storing shift schedules therein) 109, a gear position is determined on the basis of the throttle valve opening 121, vehicle speed 123, vehicle weight 126 and load torque 1028. The determined gear position 129 is delivered to hydraulic drive means 111.

The hydraulic drive means 111 determines the driving hydraulic pressure of the clutch of the automatic transmission and drives the clutch so as to establish the determined gear position 129.

Figure 2:
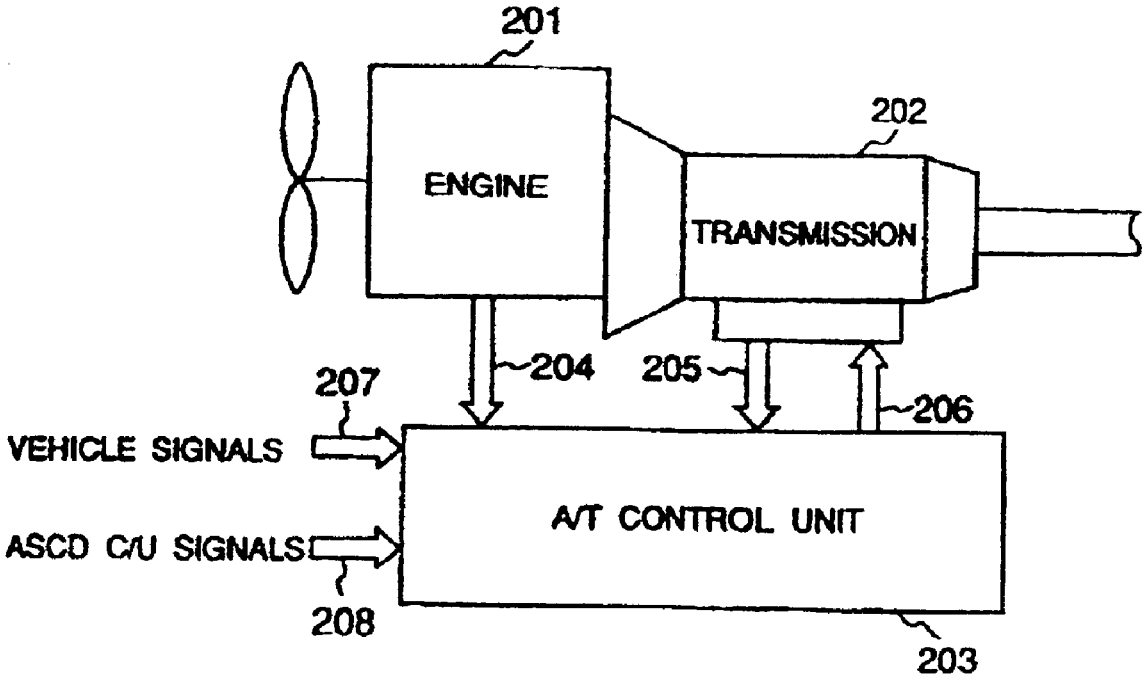
FIG. 2 is a schematic block diagram showing the hardware elements of the shift control system depicted in FIG. 1.

FIG. 2 illustrates the arrangement of an engine and drive train and a control unit therefor for use in the embodiment of the present invention. An engine 201 and a transmission 202 supply the AT (automatic transmission) control unit 203 with signals 204 and 205 indicative of their respective operating states. In addition, vehicle signals 207 and ASCD (auto speed cruising device) control unit signals 208 are input to the AT control unit 203. In the AT control unit 203, a gear position is determined from the received signals so as to deliver shift instruction signals 206 to the transmission 202.

Figure 3:
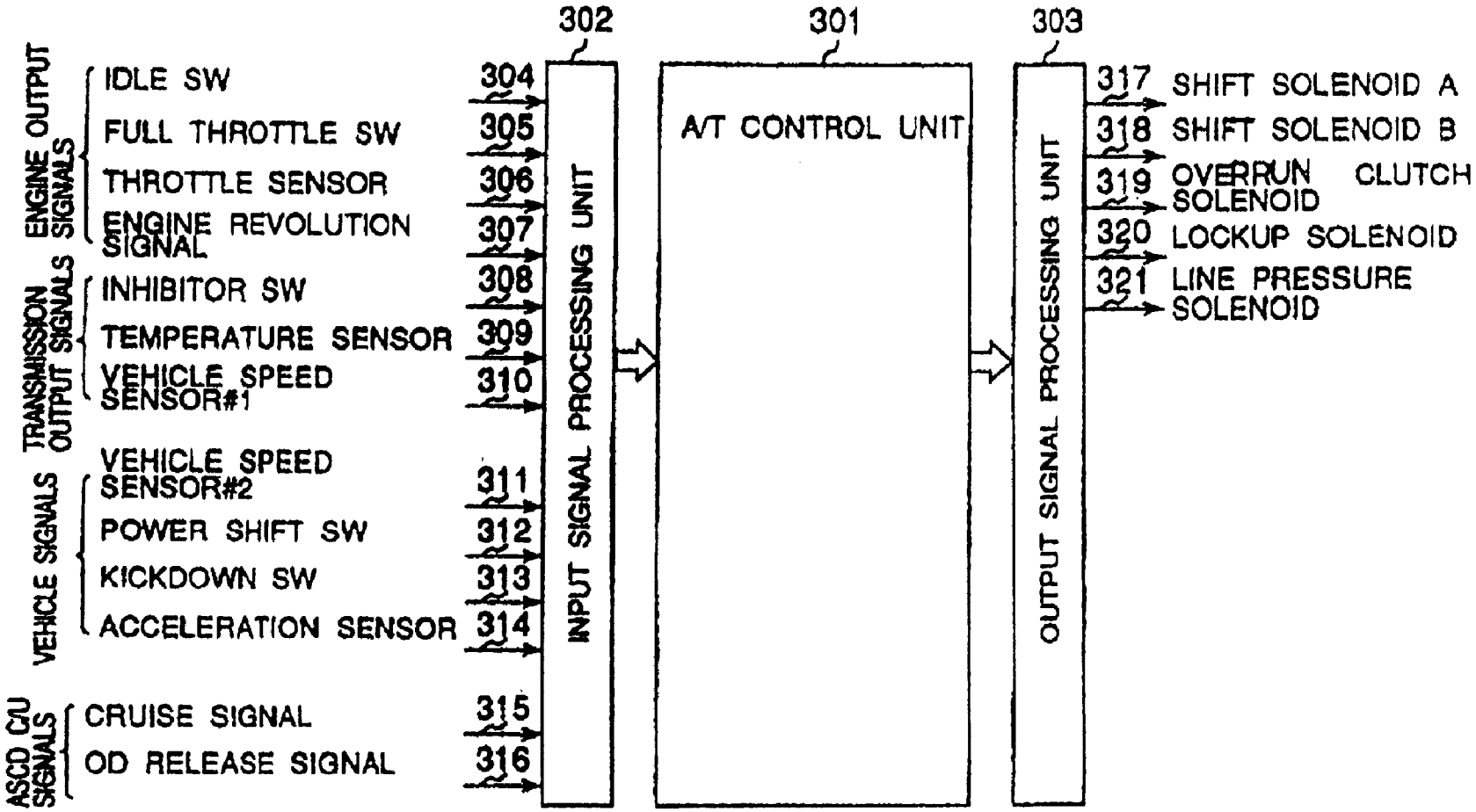
FIG. 3 is an explanatory diagram showing the details of input signals to and output signals from an AT (automatic transmission) control unit.

FIG. 3 illustrates the details of the signals shown in FIG. 2. Signals 304 thru 307 in FIG. 3 correspond to the engine output signals 204 in FIG. 2, while signals 308 thru 310 correspond to the transmission output signals 205. Besides, signals 311 thru 314 correspond to the vehicle signals 207, while signals 315 and 316 correspond to the ASCD control unit signals 208. On the other hand, signals 317 thru 321 correspond to the AT control unit signals 206. In FIG. 3, the input signals 304~316 are supplied to an AT control unit 301 through an input signal processing unit 302. Further, the output signals 317~321 from the AT control unit 301 are delivered through an output signal processing unit 303.

In the present invention, a vehicle weight estimating method utilizes the fact that the vehicle acceleration and the vehicle speed, which arise when the driver of the automobile has depressed the accelerator pedal thereof, differs depending upon the vehicle weight. Thus, the vehicle weight is recognized from an accelerating response waveform. With this method, the cost of the control system is not increased by the use of a sensor for measuring the vehicle weight, and the vehicle weight can be estimated with a precision satisfactory for the shift control of the automatic transmission.

Figure 4:
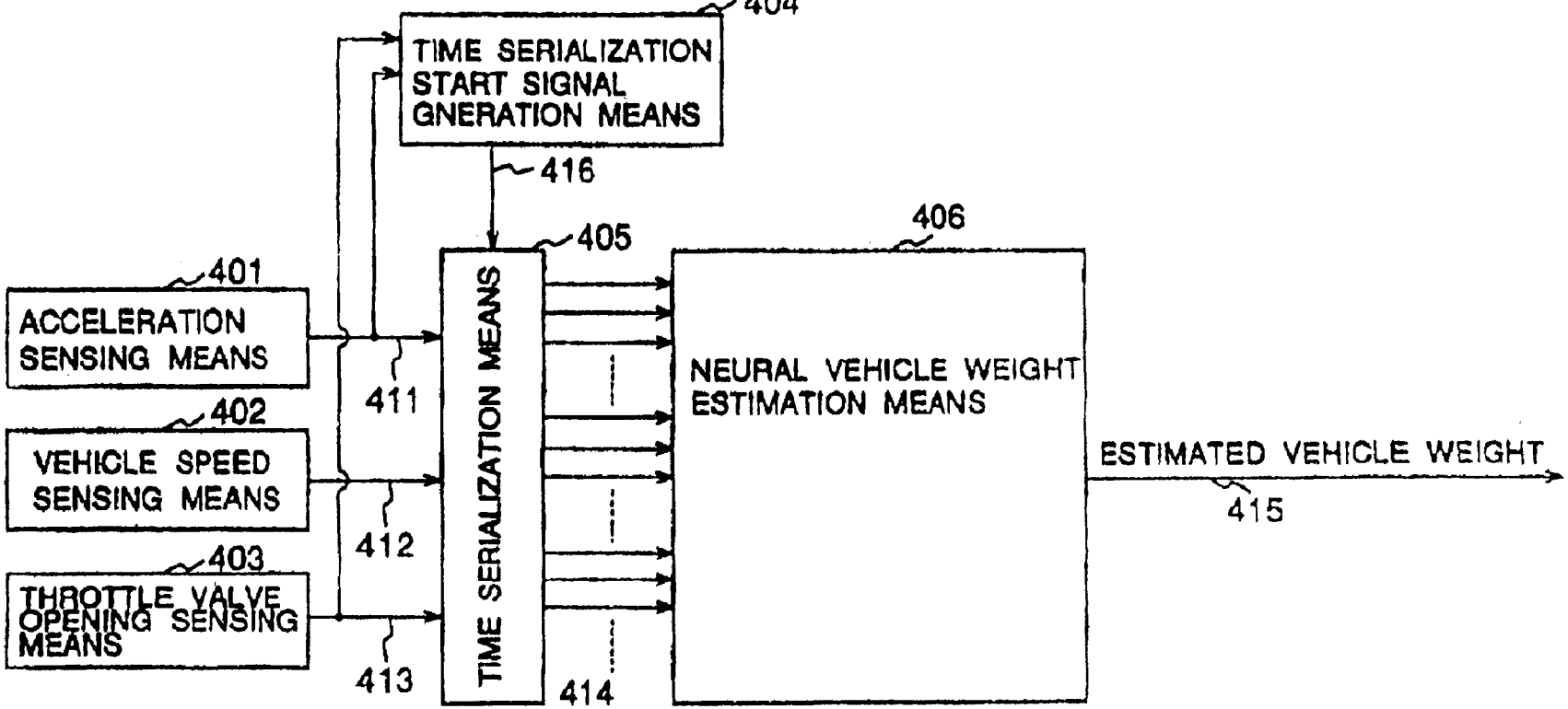
FIG. 4 is a block diagram of a vehicle weight estimation section which includes vehicle weight estimation means.

FIG. 4 is a detailed block diagram showing an example of the vehicle weight estimation means 106 depicted in FIG. 1. In FIG. 4, acceleration sensing means 401 delivers an acceleration signal 411 to time serialization means (acceleration input means) 405 and time serialization start signal generation means 404. Vehicle speed sensing means 402 delivers a vehicle speed signal 412 to the time serialization means 405. TVO sensing means 403 delivers a throttle valve opening signal 413 to the time serialization means 405 and the time serialization start signal generation means 404.

The time serialization start signal generation means 404 monitors both the signals of the acceleration 411 and the throttle valve opening 413, and it sends a signal 416 to the time serialization means 405 to start time serialization when the acceleration has risen owing to the driver's depression of the accelerator pedal, in other words, in conformity with the accelerating response waveform.

Upon receiving the time serialization start signal 416, the time serialization means 405 time-serializes the acceleration 411, vehicle speed 412 and throttle valve opening 413 so as to deliver time-serial signals 414 to neural vehicle weight estimation means 406. The neural vehicle weight estimation means 406 estimates the vehicle weight on the basis of the received time-serial signals 414, and delivers an estimated vehicle weight 415.

Figure 5:
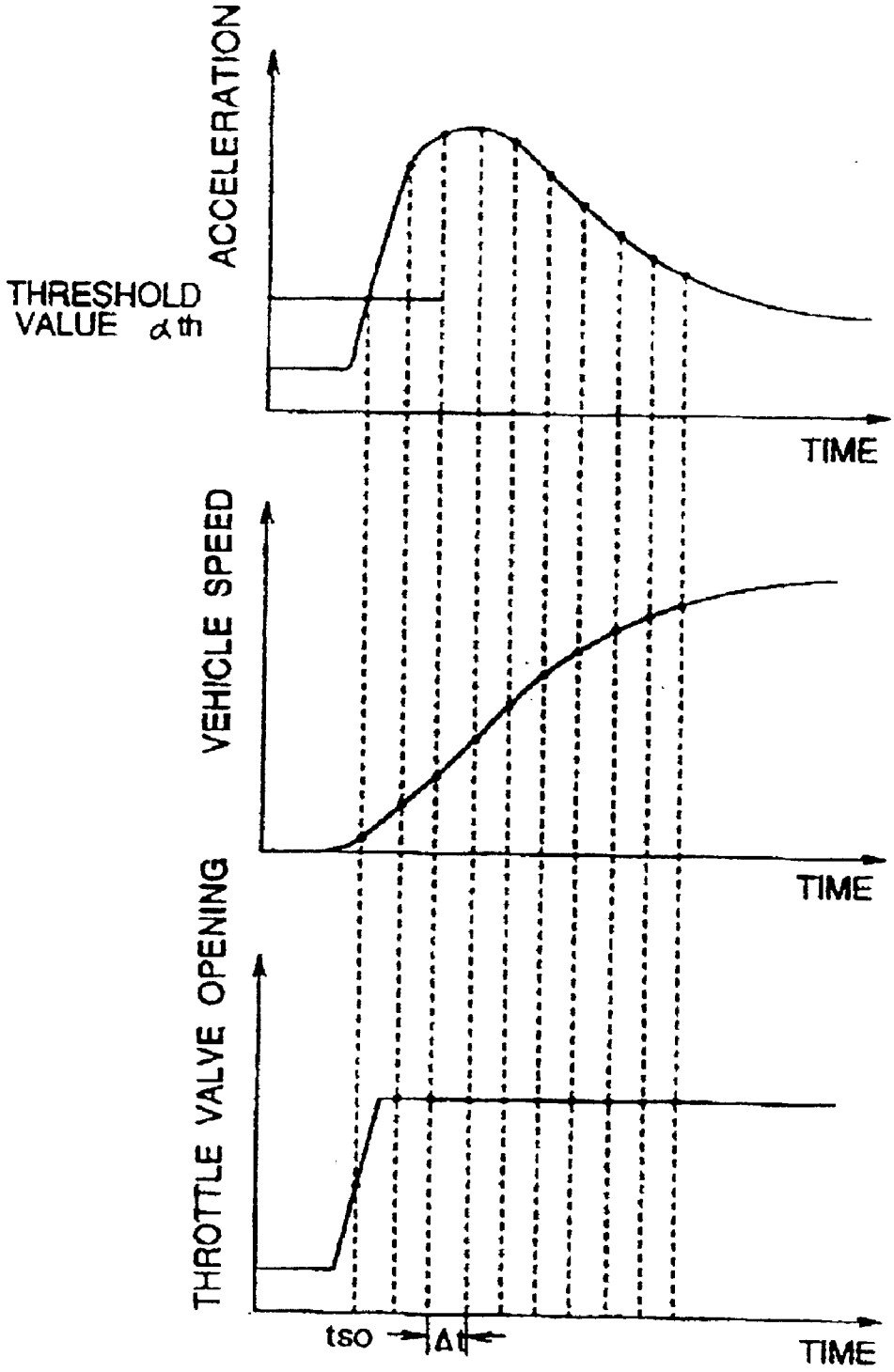
FIG. 5 is a diagram for explaining the time serialization of an acceleration response waveform.

FIG. 5 is a diagram for explaining the time serialization of the accelerating responses of the acceleration, vehicle speed and throttle valve opening. The time serialization is started at the point of time tso at which the acceleration has exceeded a predetermined threshold value $\alpha$th. Then, the acceleration, vehicle speed and throttle valve opening are sampled at regular intervals of $\Delta t$.

Figure 6:
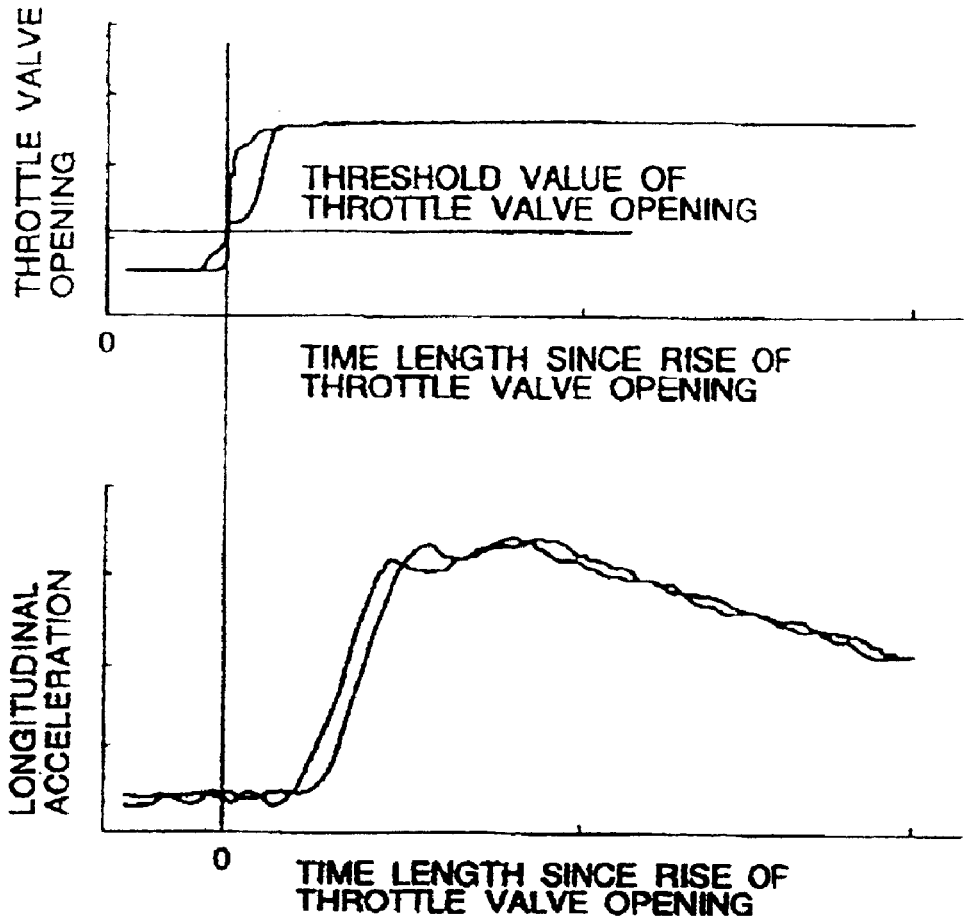
FIGS. 6A and 6B are diagrams for explaining a method of starting the time serialization.
Figure 6:
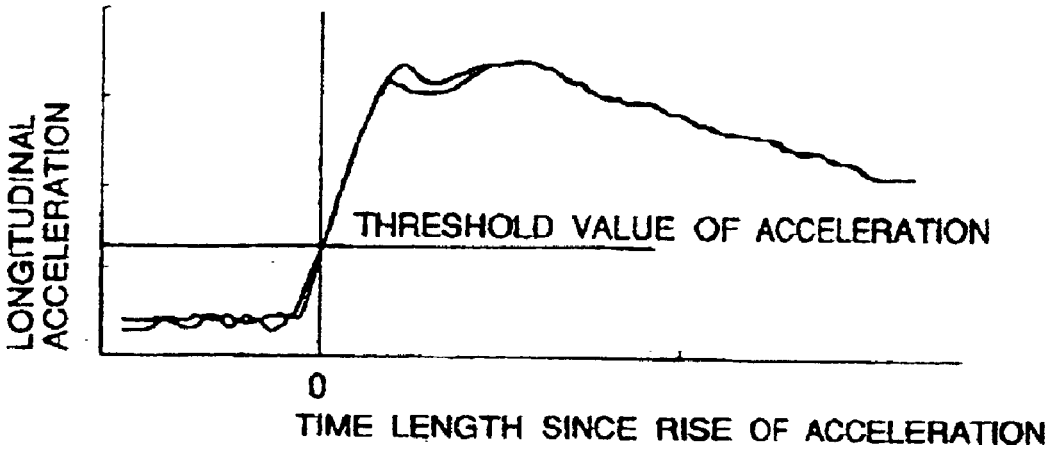

The reason why the threshold value is set for the acceleration will be elucidated with reference to FIGS. 6A and 6B. In a case where a threshold value is set for the throttle valve opening for the purpose of the time serialization in the accelerating mode and where the sampling is initiated in synchronism with the rise of the throttle valve opening, the rise of the longitudinal acceleration (the acceleration in the longitudinal direction of the body of the automobile) becomes discrepant because of an individual difference involved in the way the driver depresses the accelerator pedal. In order to eliminate the discrepancy, the threshold value is set for the acceleration, and the sampling is started when the acceleration has exceeded the threshold value.

Figure 7:
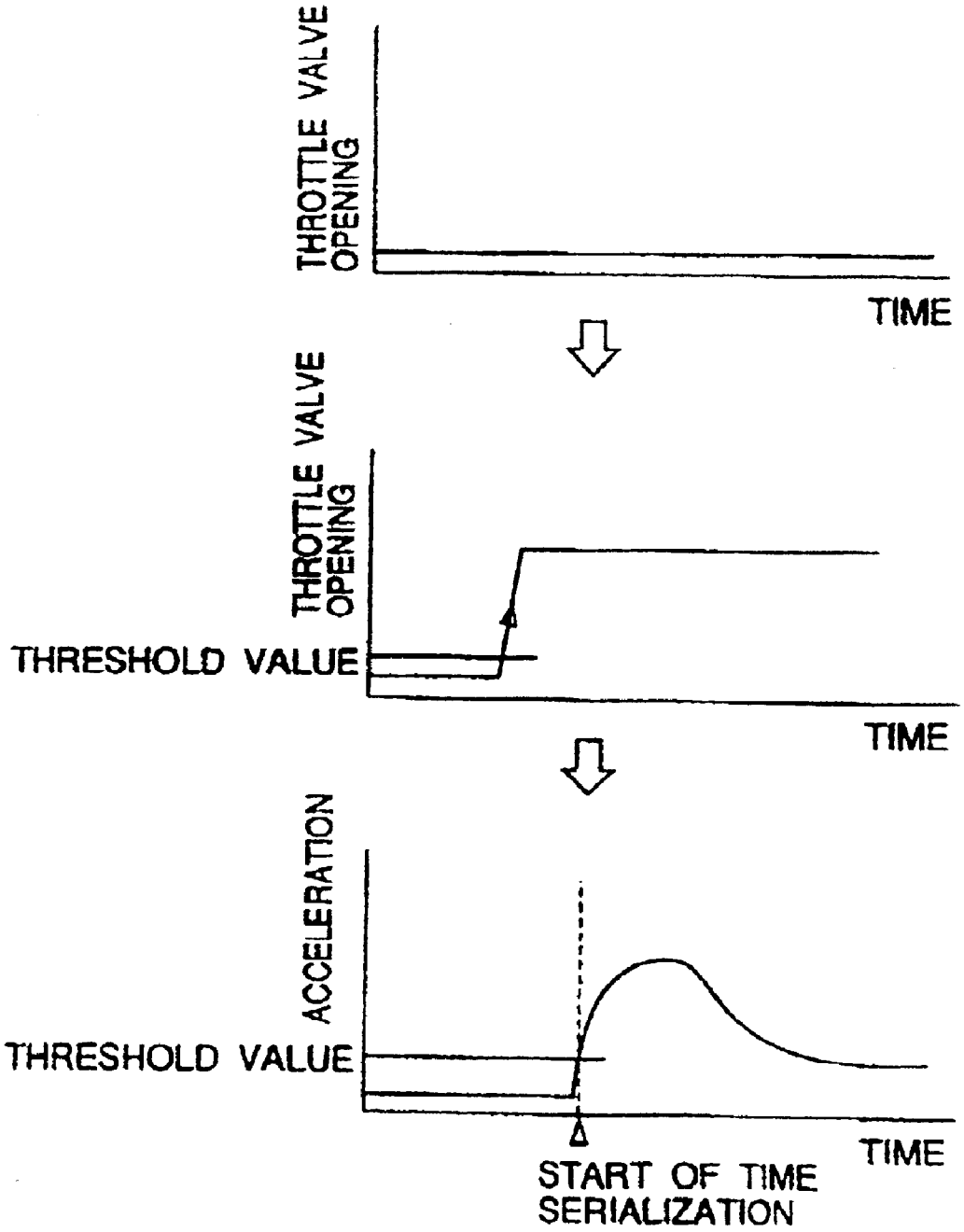
FIG. 7 is a diagram for explaining the flow of processing for the generation of a time serialization start signal.

FIG. 7 illustrates the procedure of the processing of the time serialization start signal generation means 404 shown in FIG. 4. First, the closure of a throttle valve is confirmed. Subsequently, the opening of the throttle valve rises and exceeds the preset threshold value. Thereafter, the time serialization is initiated when the acceleration has exceeded the threshold value.

Figure 8:
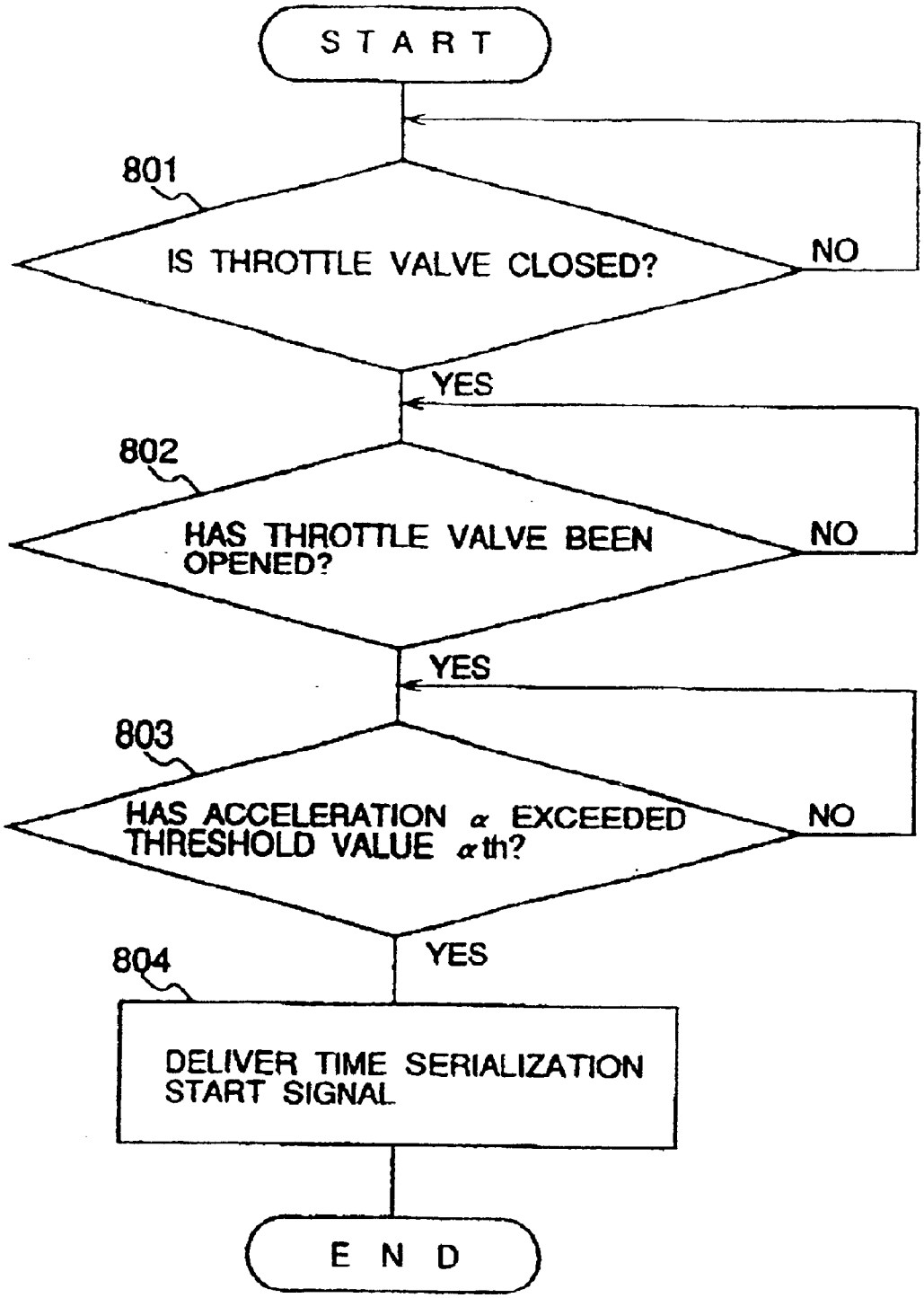
FIG. 8 is a flow chart showing the processing steps of means for generating the time serialization start signal.

FIG. 8 illustrates the flow of that processing of the time serialization start signal generation means 404 which corresponds to FIG. 5. More specifically, whether or not the throttle valve is closed is checked at a step 801. When the throttle valve is closed, the processing flow proceeds to a step 802, and when not, it returns to the step 801. Further, when the throttle valve opening $\theta$ has exceeded its threshold value $\theta$th at the step 802, the processing flow proceeds to a step 803, and when not, it returns to the step 802. On condition that the acceleration $\alpha$ has exceeded its threshold value $\alpha$th at the step 803, the processing flow proceeds to a step 804. Otherwise, the processing flow returns to the step 803. At the step 804, the time serialization start signal 416 indicated in FIG. 4 is delivered.

Figure 9:
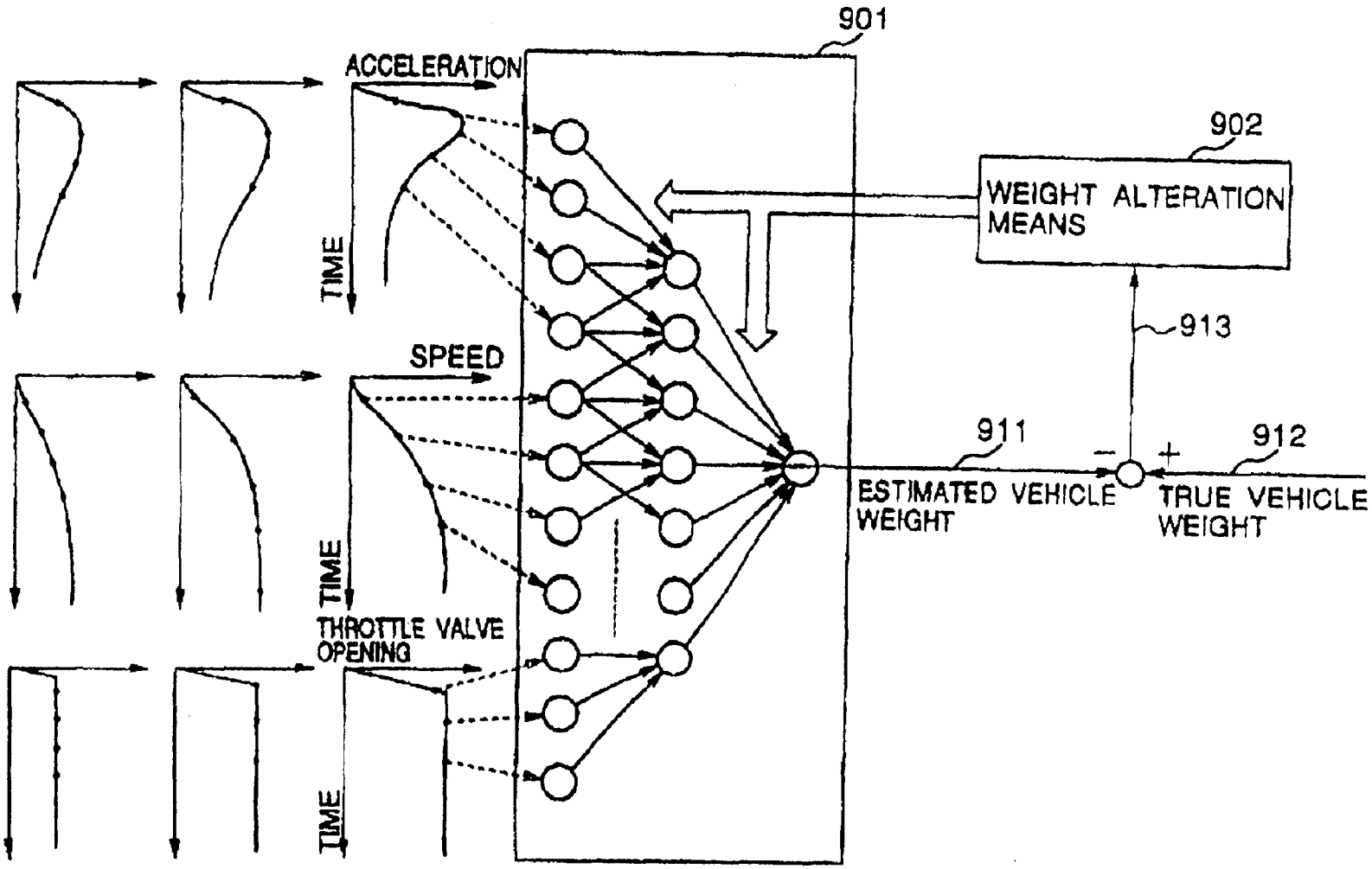
FIG. 9 is a diagram for explaining the learning method of a neural network which is used in the vehicle weight estimation means depicted in FIG. 4.

FIG. 9 is a diagram showing the learning method of a neural network which is used for the estimation of the vehicle weight. Referring to the figure, vehicle weight estimation means 901 is constructed of the Rumelhart type neural network which consists of an input layer, an intermediate layer and an output layer. Each of the three layers includes one or more neurons or arithmetic elements, and the neurons of the adjacent layers are coupled by synapses. Signals are transmitted along the input layer → the intermediate layer → the output layer. Each of the synapses is endowed with a weight and the output signal of the corresponding neuron is multiplied by the weight of the synapse to form the input signal of the next neuron. Each neuron converts the sum of the input signals into the output signal by the use of a sigmoidal function.

The neural network 901 learns the vehicle weight in such a way that the weights of the respective synapses are so altered as to diminish the error between the true weight of the automobile and the vehicle weight estimated from the inputs of the acceleration, vehicle speed and throttle valve opening. In order to cope with various aspects of depressing the accelerator pedal, accelerating response waveforms are previously measured by experiments based on the time serialization method shown in FIG. 4, while the vehicle weight and the throttle valve opening are being changed on an identical automobile. Subsequently, the time-serial waveforms of the acceleration, vehicle speed and throttle valve opening are input to the neural network 901, thereby obtaining the estimated vehicle weight 911. Next, the error 913 of the estimated vehicle weight 911 with respect to the true vehicle weight 912 is calculated.

Weight alteration means 902 alters the weights of the inter-layer synapses so as to diminish the error 913 between the estimated vehicle weight 911 and the true vehicle weight 912. As an algorithm for altering the weights, a back-propagation algorithm is typical, but another algorithm may well be employed.

A running load is estimated in order to perform the shift control in accordance therewith. Herein, the running load is evaluated by estimating an output torque and solving the equation of motion on the basis of the estimated output torque, the acceleration and the estimated vehicle weight.

Regarding the output torque estimation, there is a method in which the output torque is estimated from the slip and r.p.m. (also termed "revolution number" or "speed") of the torque converter in accordance with torque converter characteristics, and a method in which it is estimated from the r.p.m. of the engine and the opening of the throttle valve in accordance with engine torque characteristics.

The estimation method based on the slip of the torque converter can estimate the output torque precisely when the slip of the torque converter is great, that is, when the ratio between the revolutions of the input and output of the torque converter is small. This method, however, exhibits an inferior precision in a region where the slip is small, that is, where the ratio between the input revolutions and the output revolutions is great.

On the other hand, the estimation method based on the engine torque characteristics exhibits a constant precision in the whole operating region of the engine, but it has the problem that torques required for operating accessories such as an air conditioner cannot be found.

In this embodiment, accordingly, in the region where the slip of the torque converter is great, the output torque is estimated on the basis of the torque converter, while at the same time, the torques necessary for operating the accessories such as the air conditioner are estimated. Besides, in the region where the slip of the torque converter is small, the output torque is calculated in such a way that the torques for the accessories estimated before are subtracted from the estimated torque based on the engine.

Figure 10:
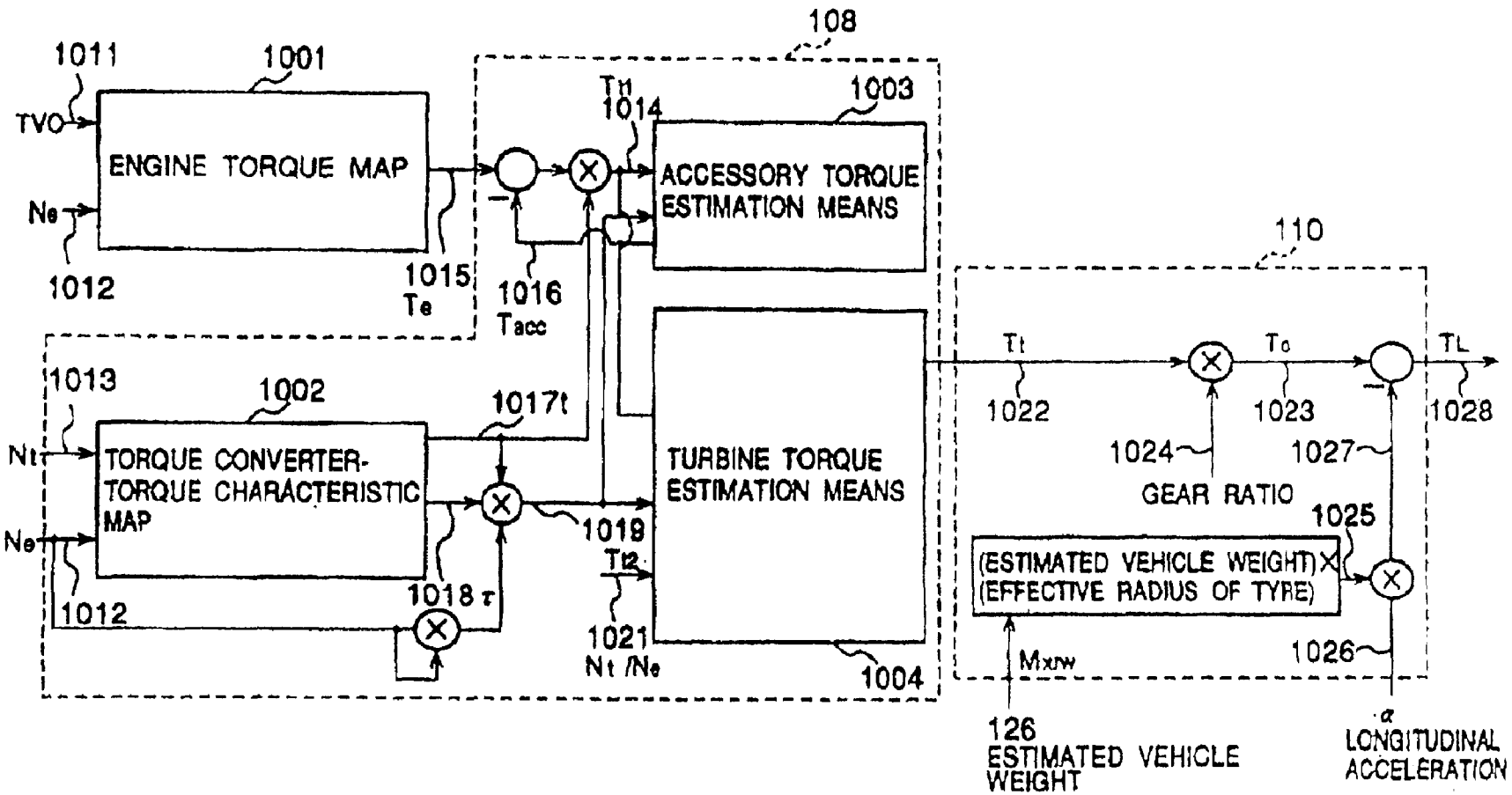
FIG. 10 is a block diagram of a shift control section which includes torque converter-generated torque estimation means, engine-generated torque estimation means and load estimation means.

FIG. 10 is a diagram for explaining the method of estimating the output torque and the method of estimating the load. In estimating the output torque from a torque generated by the engine, an engine output torque 1015 (Te) is derived from an engine torque map (engine-generated torque estimation means) 1001 on the basis of a throttle valve opening 1011 (TVO) and an engine revolution speed (or r.p.m.) 1012 (Ne). The total load torque 1016 (TRCC) of the accessories such as the air conditioner is subtracted from the engine output torque 1015, and the resulting difference is multiplied by the torque ratio 1017 (t) of the torque converter, thereby obtaining a turbine torque 1014 (Ttl) based on the engine revolution speed 1012.

On the other hand, in estimating the output torque from the pump revolution speed or r.p.m. (namely, the engine revolution speed) 1012 and turbine revolution speed or r.p.m. 1013 (Nt) of the torque converter, the ratio Nt/Ne between the turbine revolution speed 1013 and the engine revolution speed 1012 is calculated, and the torque ratio 1017 and pump torque capacity coefficient 1018 ($\tau$) of the torque converter are derived from a torque converter-torque characteristic map 1002. The pump torque capacity coefficient 1018 of the torque converter is multiplied by the square of the engine revolution speed 1012, thereby obtaining a pump torque. Further, the pump torque is multiplied by the torque ratio 1017. Then, a turbine torque 1019 is obtained.

Accessory torque estimation means 1003 compares the estimated turbine torque 1014 based on the engine and the estimated turbine torque 1019 based on the torque converter. Herein, when the ratio Nt/Ne between the turbine revolution speed and the engine revolution speed is smaller than 0.8, the estimated accessory torque 1016 is output so as to nullify the error between the turbine output torque 1014 based on the engine and the turbine output torque 1019 based on the torque converter. In contrast, when the ratio Nt/Ne between the turbine revolution speed and the engine revolution speed is not smaller than 0.8, the latest estimated accessory torque 1016 is output.

Here in this example, the output of the accessory torque estimation means 1003 is changed-over at Nt/Ne =0.8. However, the value 0.8 differs depending upon the characteristics of torque converters, and a value near the clutch point of the pertinent torque converter may be set. The reason is that the Nt/Ne values corresponding to the large errors of the pump torque capacity coefficient of the torque converter are bounded by the clutch point.

Turbine torque estimation means 1004 delivers the turbine torque based on the torque converter, as an estimated turbine torque when the ratio Nt/Ne (1021) between the turbine revolution speed and engine revolution speed of the torque converter is smaller than 0.8, and it delivers the turbine torque based on the engine, as an estimated turbine torque when not. The estimated turbine torque 1022 (Tt) thus produced is multiplied by a gear ratio 1024 (r), thereby obtaining an estimated output torque 1023 (To). An estimated running load torque 1028 (TL) is calculated in such a way that the product 1025 (M×rw) between the estimated vehicle weight 126 (refer also to FIG. 1) and the effective radius rw of a tyre or wheel is multiplied by a longitudinal acceleration 1026 ($\alpha$), whereupon the resulting product 1027 is subtracted from the estimated output torque 1023.

Figure 11A:
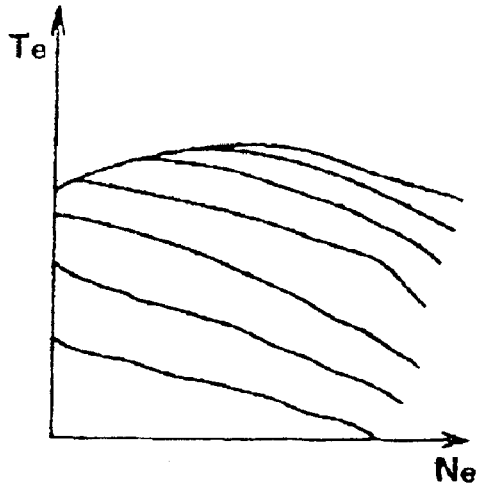
FIGS. 11(a) and 11(b) are graphs showing an engine torque map and a torque converter characteristic map, respectively.
Figure 11B:
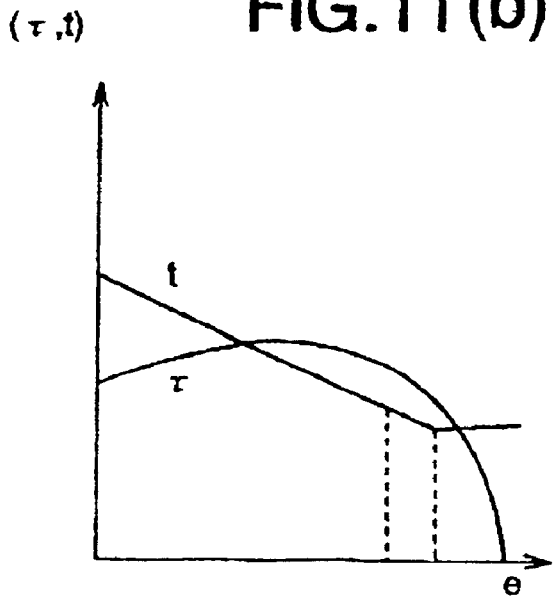

FIGS. 11(a) and 11(b) illustrate an engine torque map and a torque converter characteristic map, respectively. The engine torque map in FIG. 11(a) indicates the generated torque Te with the throttle valve opening set as a parameter, by taking the revolution speed Ne of the engine on the axis of abscissas. On the other hand, the torque converter characteristic map in FIG. 11(b) indicates the pump torque capacity coefficient $\tau$ and the ratio t of the input and output torques of the torque converter, by taking the ratio e of the input and output revolutions of the torque converter on the axis of abscissas.

Figure 12:
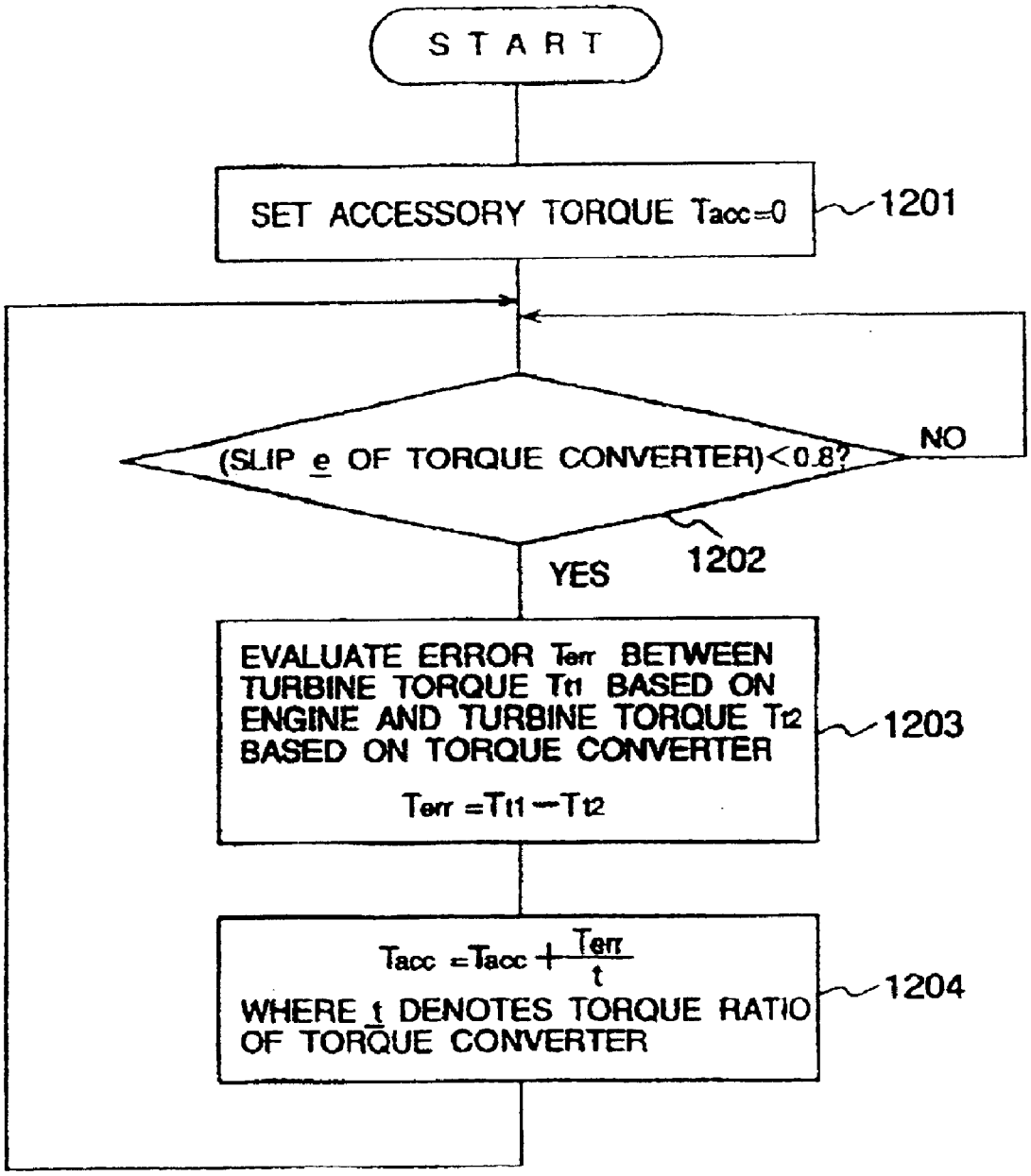
FIG. 12 is a flow chart showing a process for estimating an accessory torque.

FIG. 12 illustrates the flow of the processing of the accessory torque estimation means 1003 shown in FIG. 10. More specifically, the accessory torque is set at Tacc =0 at a step 1201. If the slip e of the torque converter, namely, the aforementioned ratio Nt/Ne between the turbine revolution speed 1013 and the engine revolution speed 1012 is smaller than 0.8, is checked at a step 1202. When the slip e is smaller than 0.8, the processing flow proceeds to a step 1203, and when not, it returns to the step 1202. At the step 1203, the difference Terr between the estimated turbine torque Tt1 based on the engine and the estimated turbine torque Tt2 based on the torque converter is evaluated as Terr=Tt1−Tt2. At the next step 1204, the estimated accessory torque Tacc is calculated as Tacc=Tacc+Terr/t where t denotes the torque ratio of the torque converter.

Figure 13:
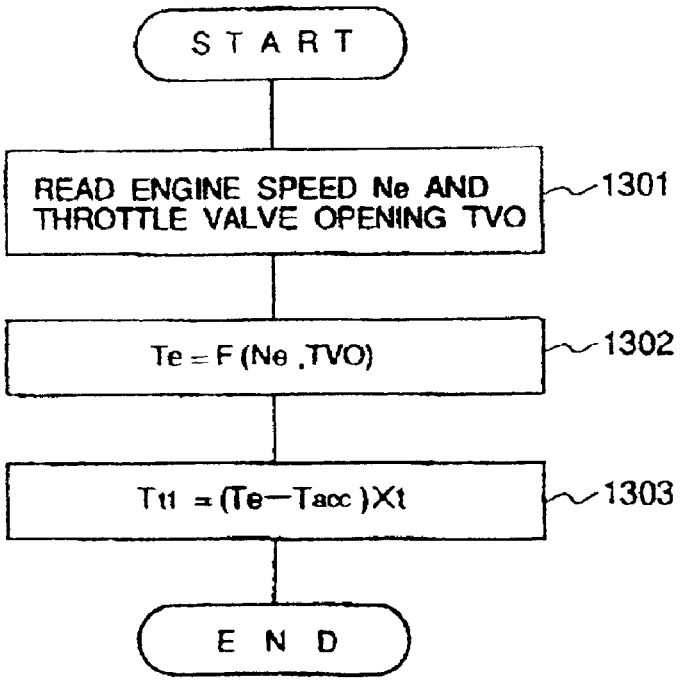
FIG. 13 is a flow chart showing a process for estimating a torque generated by an engine.

FIG. 13 illustrates the flow of a process for obtaining the estimated turbine torque Tt1 based on the engine. At a step 1301, the values of the engine revolution speed Ne and the throttle valve opening TVO are read. At the next step 1302, the engine torque Te is derived from the engine torque map 1001 in FIG. 10 (refer also to FIG. 11(a)) on the basis of the engine revolution speed Ne and the throttle valve opening TVO. At the subsequent step 1303, the turbine torque Tt1 based on the engine is calculated in such a way that the accessory torque Tacc is subtracted from the engine torque Te, whereupon the resulting difference is multiplied by the torque ratio t of the torque converter.

Figure 14:
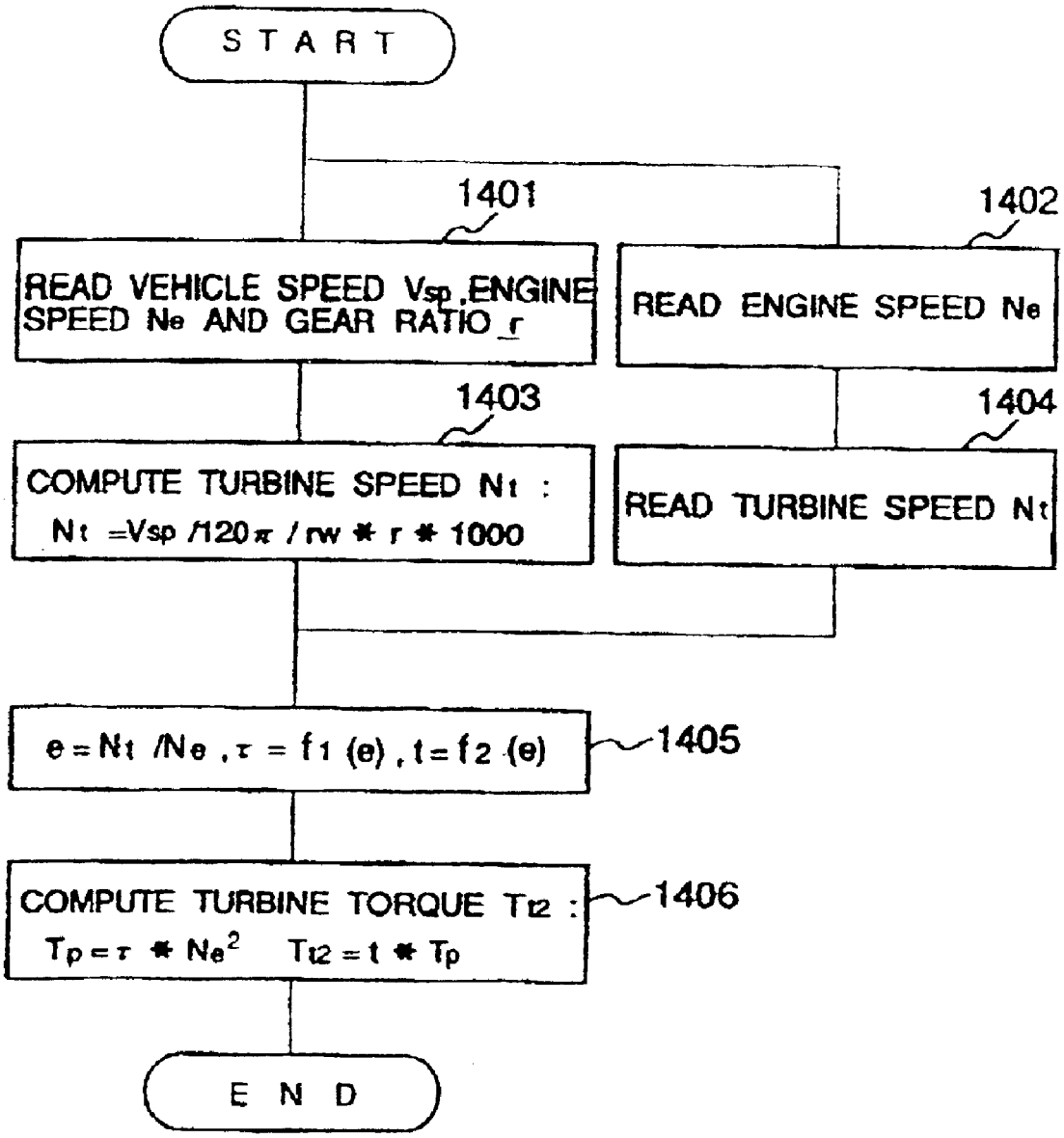
FIG. 14 is a flow chart showing a process for estimating an output torque based on a torque converter.

FIG. 14 illustrates the flow of a process for obtaining the estimated turbine torque Tt2 based on the revolutions of the torque converter. At a step 1401, the values of the vehicle speed Vsp, engine revolution speed Ne and gear ratio r are read. Subsequently, the turbine revolution speed Nt is computed from the vehicle speed Vsp and the effective radius rw of the wheel at a step 1403. At the next step 1405, the slip e of the torque converter is calculated, and the pump torque capacity coefficient $\tau$ and the torque radio t of the torque converter are derived from the torque converter characteristic map 1002 in FIG. 10 (refer also to FIG. 11(b)). At the subsequent step 1406, the turbine torque Tt2 (1019 in FIG. 10) based on the torque converter is calculated in such a way that the square of the engine revolution speed Ne is multiplied by the pump torque capacity coefficient $\tau$, thereby obtaining the pump torque Tp, whereupon the pump torque Tp is multiplied by the torque ratio t of the torque converter.

Incidentally, in this process, the turbine revolution number Nt may well be directly obtained instead of being computed from the vehicle speed Vsp. In such a case, the steps 1401 and 1403 are respectively replaced with steps 1402 and 1404. More specifically, the value of the engine revolution speed Ne is read at the step 1402, and the value of the turbine revolution speed Nt is read at the step 1404.

Figure 15:
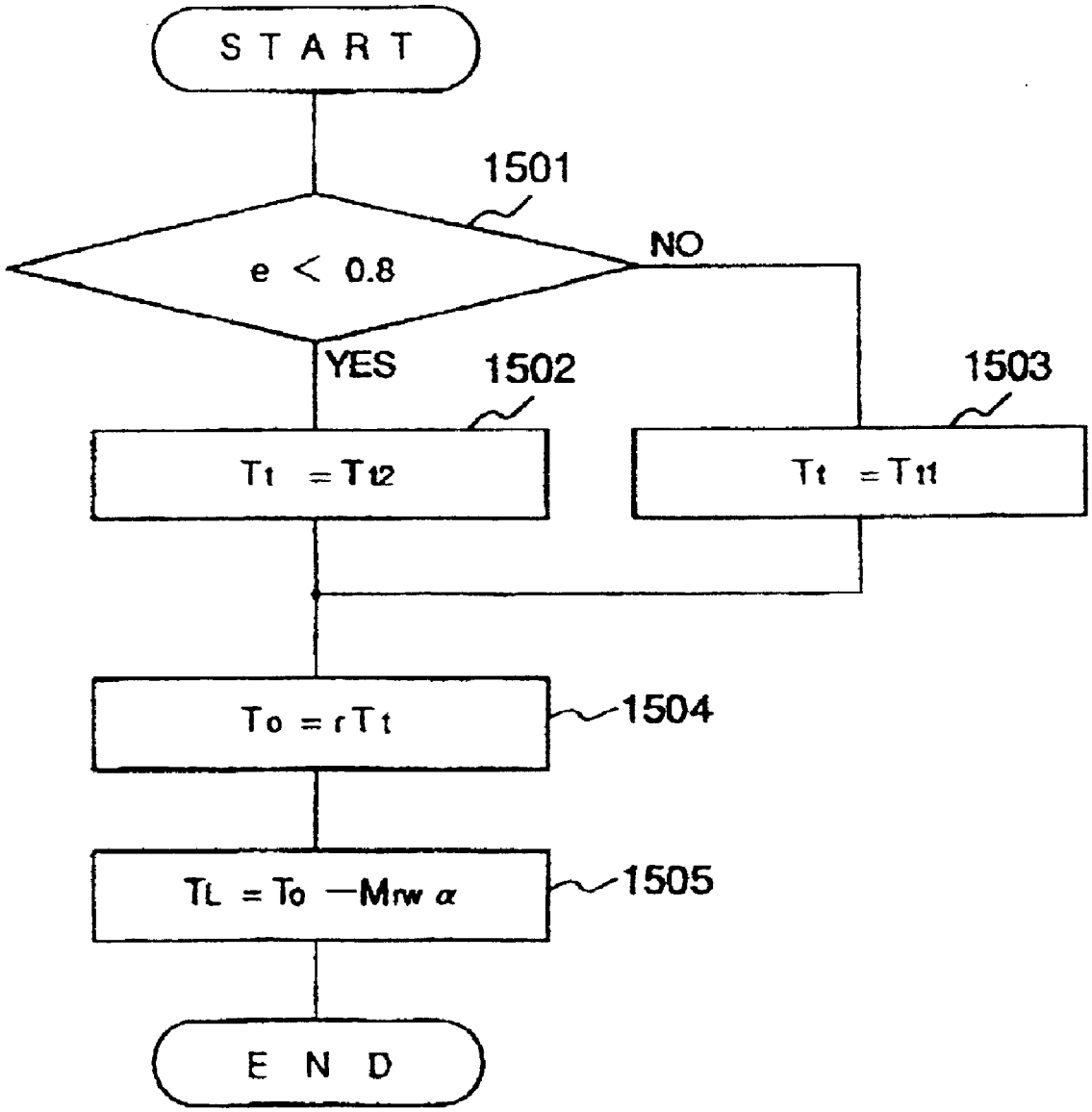
FIG. 15 is a flow chart showing a process for estimating a running load torque from the estimated output torque.

FIG. 15 illustrates the flow of a process for obtaining the estimated load torque TL from the estimated output torque To and the acceleration α. Whether the revolution ratio e of the torque converter is smaller than 0.8 is checked at a step 1501. When the ratio e is smaller, the flow proceeds to a step 1502, and when not, it proceeds to a step 1503. At the step 1502, the estimated turbine torque Tt is set at the turbine torque Tt2 based on the torque converter, whereupon the flow proceeds to a step 1504. On the other hand, at the step 1503, the estimated turbine torque Tt is set at the turbine torque Tt1 based on the engine, whereupon the flow proceeds to the step 1504. Subsequently, at the step 1504, the estimated turbine torque Tt is multiplied by the gear ratio r, thereby obtaining the estimated output torque To. At the next step 1505, the estimated load torque TL is calculated in such a way that the product among the estimated vehicle weight M, the effective radius rw of the wheel and the acceleration α is subtracted from the estimated load torque TL.

Figure 16:
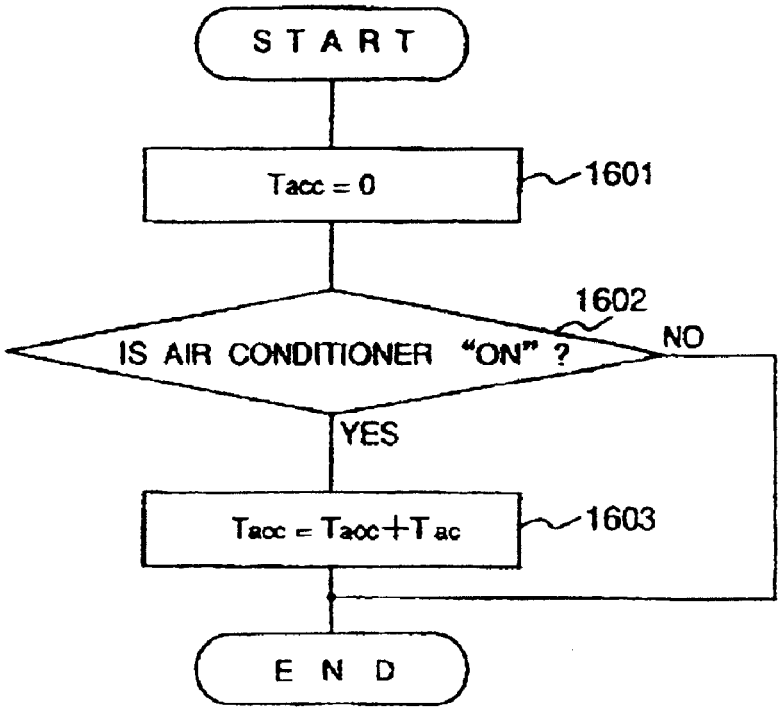
FIG. 16 is a flow chart showing another method of the process for estimating the accessory torque.

FIG. 16 illustrates another method of evaluating torques required for the accessories. This method consists in that the torques of the accessories are set for the individual devices beforehand, and that, when the pertinent device is "ON", the corresponding value is added. In the figure, the torque of an air conditioner is taken as an example.

At a step 1601, Tacc=0 is set. If the air conditioner is "ON", is checked at a step 1602. When the air conditioner is "ON", the flow of the method proceeds to a step 1603, and when not, the processing of the method is ended. At the step 1603, the accessory torque Tacc is set at Tacc=Tacc+Tac where Tac denotes the torque of the air conditioner.

Figure 17:
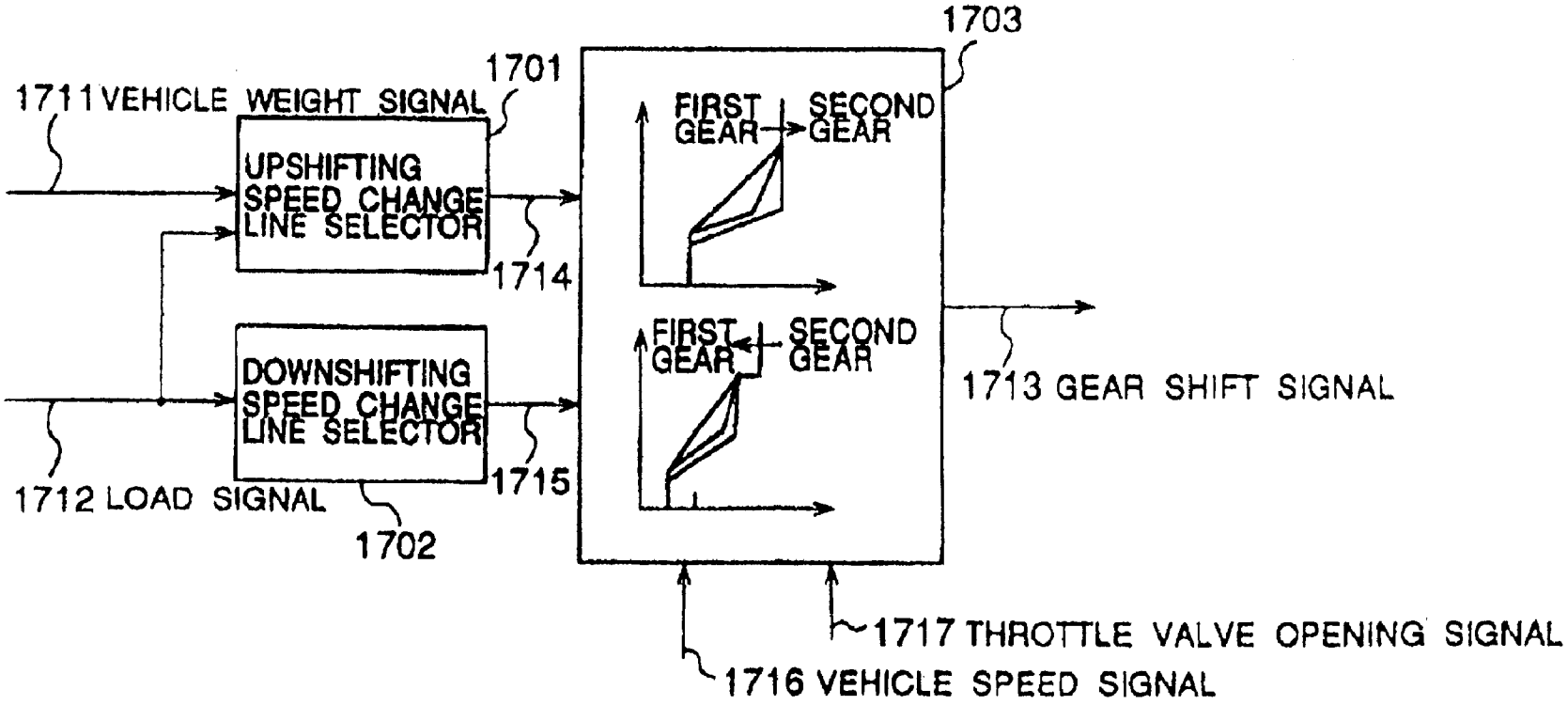
FIG. 17 is a schematic block diagram for explaining gear position determination means.

There will now be explained a control in which a shift pattern is changed on the basis of an estimated load and an estimated vehicle weight. FIG. 17 is a block diagram of gear position determination means for determining a gear position from the estimated vehicle weight and the estimated load.

An upshifting speed change line selector 1701 receives a vehicle weight signal 1711 and a load signal 1712 as inputs, and it delivers an upshifting speed change line 1714 to gear position final-determination means 1703 as an output. A downshifting speed change line selector 1702 receives the load signal 1712 as an input, and it delivers a downshifting speed change line 1715 as an output. The gear position final-determination means 1703 receives a vehicle speed signal 1716 and a throttle valve opening signal 1717 in addition to the upshifting speed change line 1714 and the downshifting speed change line 1715, and it delivers a gear shift signal 1713.

Figure 18:
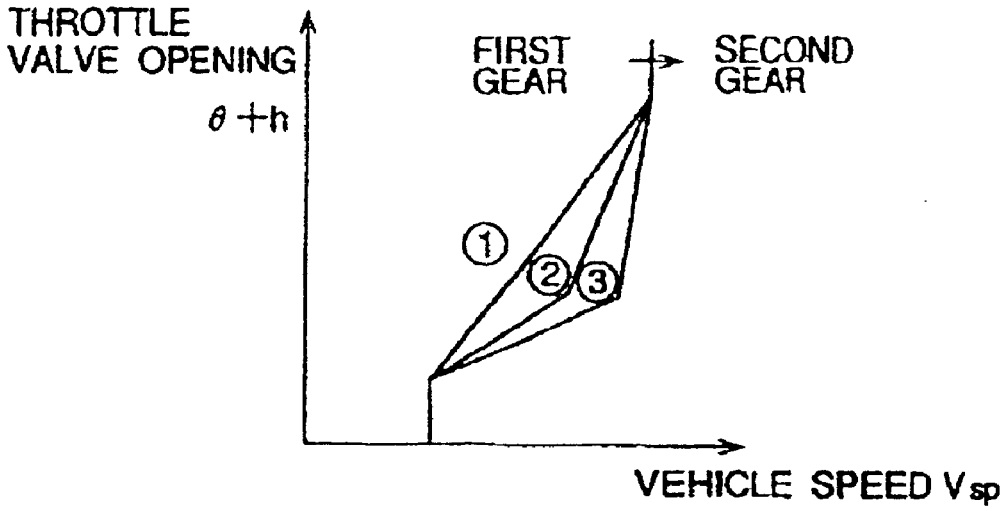
FIGS. 18(a) and 18(b) are explanatory diagrams showing shift maps in a method of altering shift schedules which are based on load estimation and vehicle weight estimation.
Figure 18:
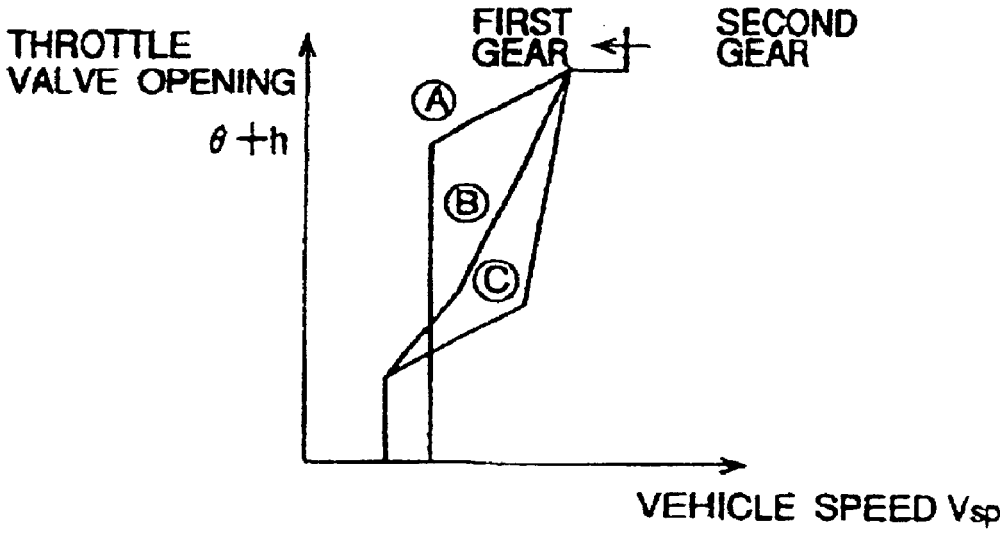

FIGS. 18(a) and 18(b) illustrate the controls based on the vehicle weight and the load, for upshift and for downshift, respectively. A shift map as shown in FIG. 18(a) is used for the upshift, while a shift map as shown in FIG. 18(b) is used for the downshift.

In the case of the upshift, the gear shift boundary follows between lines ①, ② or ③ dependent on the vehicle weight and the load moving from line 1→2→3 as such weight and speed increase. On the other hand, in the case of the downshift, the speed change line moves between lines Ⓐ, Ⓑ and Ⓒ as the load enlarges.

In the case of the downshift, when the throttle valve opening (θ+h) is small, the speed change line Ⓐ moves toward the higher vehicle speed Vsp. This is intended to apply engine braking.

Although the gear shift boundary is determined from the vehicle weight and the running load in the above embodiment, it may well be determined from only the running load.

In addition, although any of the preset gear shift boundaries is selected in the above embodiment, the gear shift boundary may well be continuously varied on the basis of the estimated load, the vehicle weight and a grade or slope. A method for the continuous variation may be such that two gear shift boundaries which do not intersect each other are set, and that they are divided internally or externally in the direction of, for example, the vehicle speed. This method will be explained in detail below.

Figure 19:
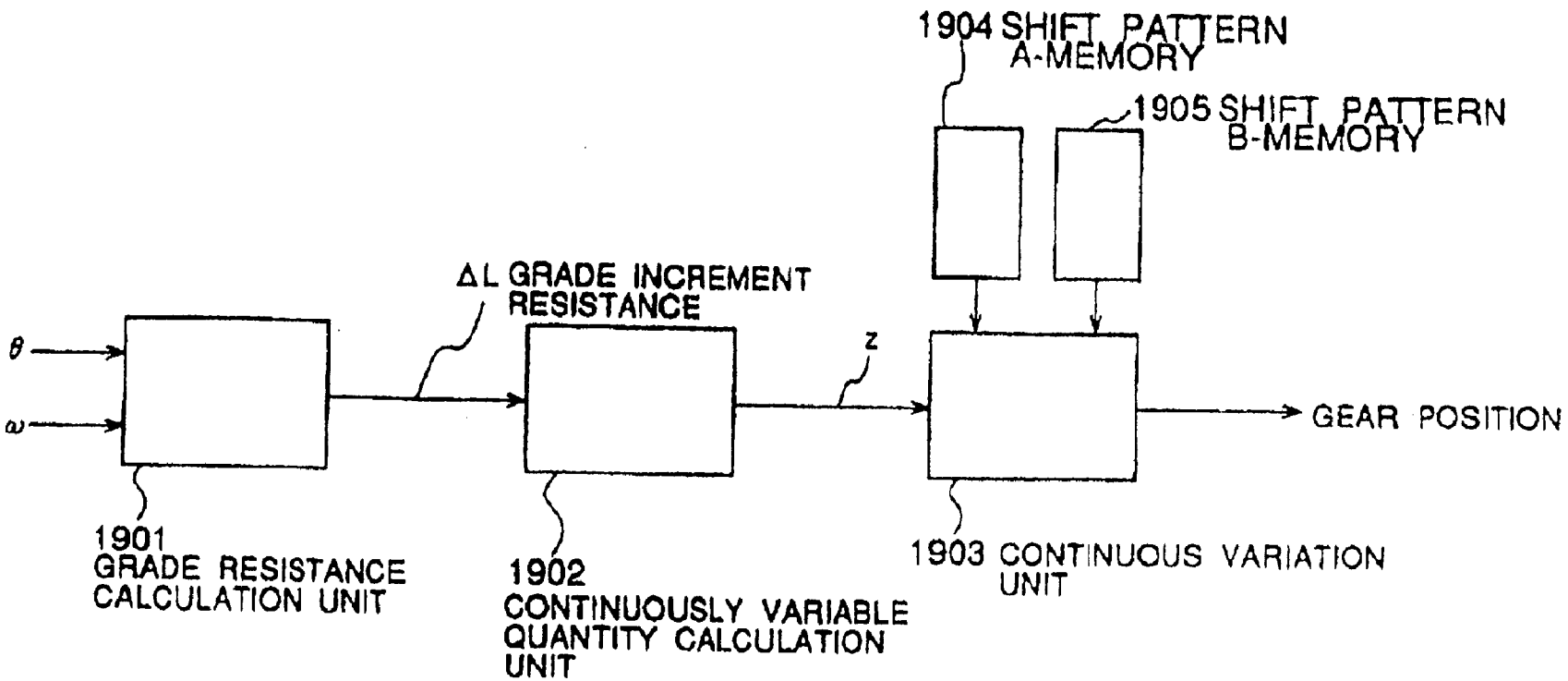
FIG. 19 is a block diagram of an automatic transmission control system being another embodiment in which a shift schedule is continuously varied in consideration of a grade or slope.

FIG. 19 is a block diagram showing another embodiment of the automatic transmission control system for an automobile in which the gear shift boundary is determined from the gradient (an inclination angle) and the vehicle weight.

This system comprises a gradient resistance (hill-climbing resistance) calculation unit (load estimation means) 1901, a continuously variable quantity calculation unit 1902, a continuous variation unit 1903, a shift pattern-A memory 1904 and a shift pattern-B memory 1905. The continuously variable quantity calculation unit 1902 and the continuous variation unit 1903 constitute a shift schedule variable-control unit. The shift pattern-A memory 1904 and the shift pattern-B memory 1905 constitute means for storing shift schedules therein.

The gradient resistance calculation unit (load estimation means) 1901 is supplied with the gradient θ and the vehicle weight W, and it calculates a gradient increment resistance ΔL in accordance with the following equation (1):

$$\Delta L = W \cdot g \cdot \sin\theta \tag{1}$$

where g denotes the gravitational acceleration.

The continuously variable quantity calculation unit 1902 calculates a continuously variable quantity Z in accordance with the following equations (2) and (3):

$$y = \frac{\Delta L}{W_{st} \cdot g} \left( vy = \frac{W}{W_{st}} \cdot \theta \right) \tag{2}$$

where y denotes a gradient equivalent coefficient, which may well be calculated by the aforementioned equation $$y = \frac{W}{W_{st}} \cdot \theta.$$

Besides, Wst represents a standard vehicle weight previously set as a default, and e represents a continuously variable quantity-conversion coefficient.

Figure 20:
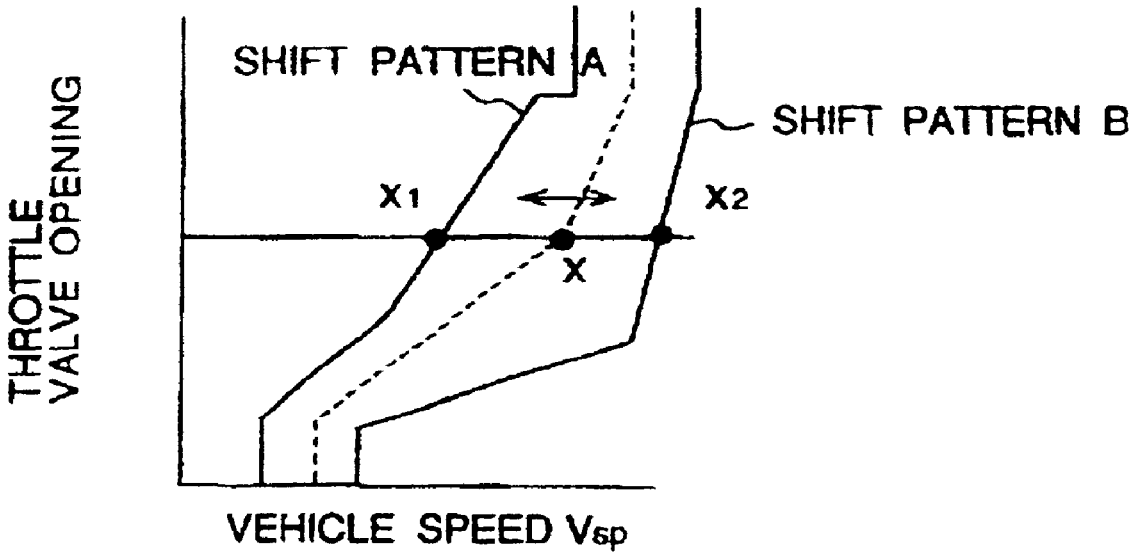
FIG. 20 is an explanatory diagram showing a shift map in the embodiment illustrated in FIG. 19.

The continuous variation unit 1903 determines a gear position in such a way that a value X indicated by Equation (4) below is calculated from the continuously variable quantity Z, whereupon the gear shift boundary is variably obtained on the basis of the value X and the throttle valve opening as illustrated in FIG. 20. Shift patterns A and B indicated in FIG. 20 are respectively sent from the shift pattern-A memory 1904 and the shift pattern-B memory 1905. Thus, a smooth shift operation conforming to the gradient is realized.

$$X = X1 + (X2 - X1) \cdot Z \tag{4}$$

Figure 21A:
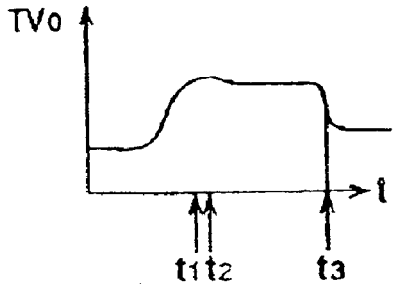
FIGS. 21(a), 21(b) and 21(c) are graphs for explaining how to decide an acceleration request.
Figure 21B:
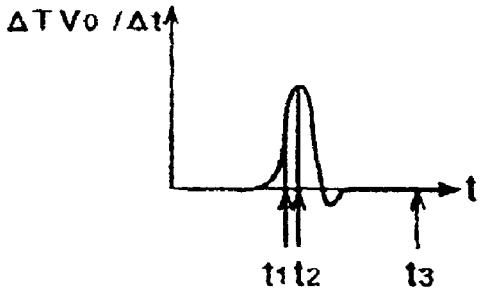

There will now be explained a case where a gear position is determined from the vehicle weight, the gradient and an acceleration request. In this case, the gradient increment resistance in FIG. 19 is evaluated as stated below. Processing after the evaluation of the gradient increment resistance is the same as in FIG. 19. First, the temporal variation of the throttle valve opening as shown in FIG. 21(a) is measured. Subsequently, the time derivative of the throttle valve opening is obtained as shown in FIG. 21(b). The acceleration request $\alpha$ is calculated in accordance with the preset functional relationship of the following equation (5), on the basis of the throttle valve opening (TVO) and the time derivative thereof:

$$\alpha=f(\Delta TVO/\Delta T, TVO, t) \quad (5)$$

Figure 21C:
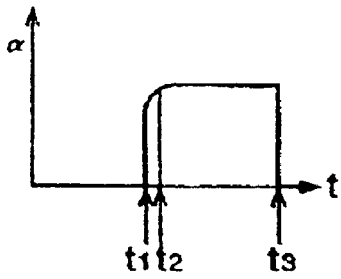

An example of the obtained result of the acceleration request $\alpha$ is shown in FIG. 21(c). In this manner, the presence of the acceleration request $\alpha$ is decided when the throttle valve opening and the differentiated value thereof have predetermined values or above.

The gradient increment resistance $\Delta L$ is calculated by the following equation (6) on the basis of the vehicle weight W, the gradient $\theta$ and the decided acceleration request $\alpha$:

$$\Delta L=W\cdot g\cdot \sin\theta+W\cdot\alpha \quad (6)$$

With this embodiment, a smooth shift operation with the acceleration request also taken into consideration can be realized.

As described above, according to the present invention, the vehicle weight is estimated from the drive characteristics of the automobile, the output torque is estimated from the slip of the torque converter or from the revolution speed of the engine and the opening of the throttle valve, and the running load is estimated from the output torque and the acceleration. Then, in the upshift operation, the gear shift boundary is moved by utilizing both the vehicle weight and the running load, while in the downshift operation, it is moved in consideration of only the running load. Thus, the fuel consumption is enhanced, and the exact shift operation conformed to the drive conditions is realized.

Incidentally, although the foregoing embodiments have been described as estimating the vehicle weight, the present invention is not restricted thereto. The vehicle weight may well be directly measured by a sensor.

According to the present invention, a running load is estimated, and a shift operation conformed to a vehicle weight and the running load is performed. It is therefore possible to provide an automatic transmission control system for an automobile in which the optimal shift pattern is formed in conformity with a driving environment (such as driving on a mountain path, or driving with many passengers on board), thereby enhancing the drivability of the automobile, and in which the fuel consumption of the automobile is enhanced more than in the prior art when driving on a flat road.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. System for controlling selection of gear position for an automatic transmission of an automobile comprising:

weight estimation means for estimating a local weight of said automobile;

acceleration input means for receiving an acceleration signal indicative of acceleration of said automobile;

output torque estimation means for estimating an output torque based on torque characteristics of a drive train of said automobile;

running load estimation means for estimating a running load from the estimated weight of the automobile, the acceleration, and the estimated output torque;

memory means for storing at least two shift schedules therein;

a shift schedule variable-control unit which determines a shift schedule of an automatic transmission of said drive train during actual running of said automobile on the basis of the estimated running load, the estimated weight of the automobile and the stored shift schedules; and gear shift determination means for selecting a gear position of said automatic transmission based on the determined shift schedule;

wherein said output torque estimation means estimates said output torque based on torque characteristics of an engine of said drive train when a ratio between an input revolution speed and an output revolution speed of said torque converter is greater than a predetermined value, and based on torque characteristics of a torque converter of said automatic transmission when said ratio is less than said predetermined value.

2. System for controlling selection of gear position for an automatic transmission of an automobile, comprising:

weight estimation means for estimating a total weight of said automobile;

acceleration input means for receiving an acceleration signal indicative of acceleration of said automobile;

output torque estimation means for estimating an output torque based on torque characteristics of a drive train of said automobile;

running load estimation means for estimating a running load from the estimated weight of the automobile, the acceleration, and the estimated output torque;

memory means for storing at least two shift schedules therein;

a shift schedule variable-control unit which determines a shift schedule of an automatic transmission of said drive train during actual running of said automobile on the basis of the estimated running load, the estimated weight of the automobile and the stored shift schedules;

gear shift determination means for selecting a gear position of said automatic transmission based on the determined shift schedule; and a neural network which has stored therein values of at least a throttle valve opening and said acceleration of the automobile for learning values of a vehicle weight corresponding to the values of at least said throttle valve opening and said accelerations;

wherein said vehicle weight estimation means estimates said vehicle weight by time-serializing each of at least said throttle valve opening and said acceleration and then supplying resultant time-serial signals to said neural network.

3. An automatic transmission control system for an automobile as defined in claim 2, wherein said vehicle weight estimation means includes means for supplying said time-serial signals of said throttle valve opening and said acceleration, commencing when said throttle valve opening has exceeded a second predetermined value and said acceleration has also exceeded a third predetermined value.

4. System for controlling selection of gear position for an automatic transmission of an automobile, comprising:

weight estimation means for estimating a total weight of said automobile;

acceleration input means for receiving an acceleration signal indicative of acceleration of said automobile;

output torque estimation means for estimating an output torque based on torque characteristics of a drive train of said automobile;

running load estimation means for estimating a running load from the estimated weight of the automobile, the acceleration, and the estimated output torque;

memory means for storing at least two shift schedules therein;

a shift schedule variable-control unit which determines a shift schedule of an automatic transmission of said drive train during actual running of said automobile on the basis of the estimated running load, the estimated weight of the automobile and the stored shift schedules; and gear shift determination means for selecting a gear position of said automatic transmission based on the determined shift schedule;

wherein said vehicle weight estimation means estimates said vehicle weight of said automobile in response to a throttle valve opening signal and a vehicle speed signal in addition to said acceleration signal; and wherein said output torque estimation means estimates said output torque in response to a revolution speed signal of an engine of said drive train and a turbine revolution speed signal of a torque converter of said automatic transmission.

5. System for controlling selection of gear position for an automatic transmission of an automobile, comprising:

weight estimation means for estimating a total weight of said automobile;

acceleration input means for receiving an acceleration signal indicative of acceleration of said automobile;

output torque estimation means for estimating an output torque based on torque characteristics of a drive train of said automobile;

running load estimation means for estimating a running load from the estimated weight of the automobile, the acceleration, and the estimated output torque;

memory means for storing at least two shift schedules therein;

a shift schedule variable-control unit which determines a shift schedule of an automatic transmission of said drive train during actual running of said automobile on the basis of the estimated running load, the estimated weight of the automobile and the stored shift schedules; and gear shift determination means for selecting a gear position of said automatic transmission based on the determined shift schedule;

wherein said output torque estimation means has a first mode in which said output torque is estimated from a turbine revolution speed of a torque converter of said automatic transmission and a revolution speed of an engine of said drive train, and a second mode in which said output torque is estimated from a throttle valve opening of said engine and said revolution speed of said engine, one of said first and second modes being selected in response to a ratio between an input and an output revolution speeds of said torque converter of said automatic transmission.

6. Method of controlling selection of gear position for automatic transmission of an automobile having means for storing a plurality of shift schedules for said automatic transmission, said method comprising the steps of:

first, calculating an estimated weight of said automobile;

second, determining acceleration of said automobile;

third, calculating a value for an output torque of said transmission based on torque characteristics of a drive train of said automobile and generating an output torque signal indicative of said output torque value;

fourth, estimating a running load of said automobile based on said estimated weight of said automobile, the acceleration, and the output torque signal;

fifth, selecting a shift schedule from among a plurality of shift schedules stored in said means for storing, based on the estimated running load and the estimated weight of the automobile; and sixth, selecting a gear position of said automatic transmission based on the selected shift schedule;

wherein said third step comprises calculating said output torque based on torque characteristics of an engine of said drive train when a ratio between an input revolution speed and an output revolution speed of a torque converter of said automatic transmission is greater than a predetermined value, and calculating said output torque based on torque characteristics of said torque converter of said automatic transmission when said ratio is less than said predetermined value.

7. Method of controlling selection of gear position for automatic transmission of an automobile having means for storing a plurality of shift schedules for said automatic transmission, said method comprising the steps of:

first, calculating an estimated weight of said automobile;

second, determining acceleration of said automobile;

third, calculating a value for an output torque of said transmission based on torque characteristics of a drive train of said automobile and generating an output torque signal indicative of said output torque value;

fourth, estimating a running load of said automobile based on said estimated weight of said automobile, the acceleration, and the output torque signal;

fifth, selecting a shift schedule from among a plurality of shift schedules stored in said means for storing, based on the estimated running load and the estimated weight of the automobile; and sixth, selecting a gear position of said automatic transmission based on the selected shift schedule;

wherein said third step comprises calculating said output torque based on at least torque characteristics of a torque converter of said automatic transmission, and torque characteristics of an engine of said drive train; and wherein said third step comprises calculating said output torque based on said torque characteristics of the engine of said drive train when a ratio between an input revolution speed and an output revolution speed of said torque converter of said automatic transmission is greater than a predetermined value, and calculating said output torque based on said torque characteristics of said torque converter of said automatic transmission when said ratio is less than said predetermined value.

*8. Torque estimation system for estimating an input torque to be used in controlling an automatic transmission, comprising:*

*a first input-torque estimating unit for estimating a first input-torque of said automatic transmission using an engine torque characteristic;*

*a second input-torque estimating unit for estimating a second input-torque of said automatic transmission using a torque-converter characteristic;*

*a deviation calculating unit for calculating a deviation of said first estimated input-torque and said second estimated input-torque;*

*a unit for comparing a ratio Nt/Ne between a turbine revolution speed Nt and an engine revolution speed Ne with a threshold value; and*

*a correcting unit for correcting said first estimated input-torque using said deviation when the ratio Nt/Ne is not smaller than the threshold value.*

*9. Torque estimation system according to claim 8, further comprising:*

*output torque estimating unit for estimating an output torque of said automatic transmission using said corrected first estimated input-torque and a transmission ratio.*

*10. Torque estimating unit according to claim 9, further comprising:*

*acceleration estimating unit for estimating a vehicle acceleration;*

*running load estimating unit for estimating a running load using a vehicle speed, said acceleration and said output torque.*

*11. Torque estimating unit according to claim 10, further comprising a transmission ratio control unit for controlling a transmission ratio of a vehicle according to said running load.*

*12. A method of estimating an input torque for use in controlling an automatic transmission of a vehicle, the method comprising the acts of:*

*estimating a first input-torque of said automatic transmission using an engine torque characteristic;*

*estimating a second input-torque of said automatic transmission using a torque-converter characteristic;*

*calculating a deviation of said first estimated input-torque and said second estimated input-torque; and*

*comparing a ratio Nt/Ne between a turbine revolution speed Nt and an engine revolution speed Ne with a threshold value; and*

*correcting said first estimated input-torque using said deviation when the ratio Nt/Ne is not smaller than the threshold value.*

* * * * *